(12) United States Patent
El-Nakla et al.

(10) Patent No.: US 11,612,142 B1
(45) Date of Patent: Mar. 28, 2023

(54) SMART COLLAR TO TRACK LOST PETS

(71) Applicant: Prince Mohammad Bin Fahd University, Dhahran (SA)

(72) Inventors: Samir El-Nakla, Dhahran (SA); Ahmed Abul Hussain, Dhahran (SA); Alya Alajmi, Dhahran (SA); Nojod Alahmadi, Dhahran (SA); Rand Alanazi, Dhahran (SA); Saja Alherz, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 17/899,060

(22) Filed: Aug. 30, 2022

(51) Int. Cl.
*A01K 27/00* (2006.01)

(52) U.S. Cl.
CPC .......... *A01K 27/009* (2013.01); *A01K 27/001* (2013.01); *A01K 27/006* (2013.01)

(58) Field of Classification Search
CPC .. A01K 27/009; A01K 27/001; A01K 27/006; A01K 15/021; A01K 15/023
See application file for complete search history.

(56) References Cited

U.S. PATENT DOCUMENTS

| | | | | |
|---|---|---|---|---|
| 6,172,640 B1 * | 1/2001 | Durst | ................... | A01K 27/009 342/357.55 |
| 6,581,546 B1 * | 6/2003 | Dalland | ............... | A01K 15/023 119/712 |
| 11,213,010 B1 * | 1/2022 | Lewis | ................... | H04B 17/318 |

(Continued)

FOREIGN PATENT DOCUMENTS

CA    2 955 810 C    3/2021

OTHER PUBLICATIONS

"Buddy. The Dog Collar Reimagined.", Squeaker, Kickstarter, Source 1: https://www.kickstarter.com/projects/squeakerdogs/buddy-the-dog-collar-reimagined?ref=category_newest, Source 2: https://www.youtube.com/watch?v=s3eB5jyRqQU, Aug. 3, 2015-Sep. 2, 2015, 47 pages.

(Continued)

*Primary Examiner* — Kristen C Hayes
(74) *Attorney, Agent, or Firm* — Oblon, McClelland, Maier & Neustadt, L.L.P.

(57) ABSTRACT

A system, method, and non-transitory computer readable medium for using a smart collar to monitor a pet are described. The system includes a smart collar, a mobile computing device including a display screen, and a pet monitoring mobile application stored on the mobile computing device. The smart collar includes a global positioning receiver, a communications device, an organic light-emitting diode (OLED) display, a rechargeable battery, and a microcontroller. The microcontroller calculates a distance of a current location of the smart collar from a desired location, determines when the distance is greater than a first distance threshold, and generates a communications packet including the current location, the perimeter, and the distance of the smart collar from the desired location, and transmits the communications packet. The mobile computing device receives the communications packet, and the pet monitoring mobile application displays the current location on a display screen of the mobile computing device.

12 Claims, 18 Drawing Sheets

(56) References Cited

U.S. PATENT DOCUMENTS

| | | | |
|---|---|---|---|
| 2007/0107669 A1* | 5/2007 | Eaton | A01K 27/006 119/792 |
| 2015/0099472 A1* | 4/2015 | Ickovic | A01K 27/009 455/66.1 |
| 2017/0135315 A1 | 5/2017 | Marmen et al. | |
| 2018/0184618 A1* | 7/2018 | Gotts | A01K 15/023 |
| 2019/0104707 A1* | 4/2019 | Gotts | A01K 27/001 |

OTHER PUBLICATIONS

"Animal Rescue and Pet Adoption Mobile App Development for Canimx", Hidden Brains, https://www.hiddenbrains.com/canimx-animal-rescue-app.html, 2003-2022, 7 pages.

\* cited by examiner

SMART COLLAR TO TRACK LOST PETS

BACKGROUND

Technical Field

The present disclosure is directed to a system and methods for monitoring a location of a pet.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

There is a growing global trend to include pets as part of the family. Pet owners express a feeling of love for their pets and of finding enjoyment in their companionship. Studies have shown that human attachment to pets is good for human health and helps build community. For proper pet care, it is necessary to maintain schedules for the pet that include a walking schedule and a feeding schedule. Additionally, safety and security of the pet is a primary concern for pet owners. To keep the pet safe, it is essential that the pet remains within supervised premises. The location of the pet needs to be monitored. Typically, the pet owner needs to monitor the location of his or her pet when the pet is left unattended, for example, when the owner goes out for work, or when the owner takes the pet to a public place such as a park. Occasionally, a pet may stray from home and become lost while the owner is away. In this situation, many hours or sometimes a full day may pass before the pet owner realizes that the pet is lost. The longer the owner is unaware that the pet is missing, the more difficult it becomes to locate and track the pet. Also, a delay in locating the pet increases a risk of injury to the pet.

Typical pet tracking systems are passive devices, such as collars imprinted with the owner's name, address, and telephone number. These devices require the assistance of other individuals to locate and return the pet. Although these devices are helpful, they do not meet the pet owner's need for automatic notification when a pet strays away from home or runs away. The location and various activities of the pet may be monitored using a video monitoring technology, providing more information of where the pet is located in a planned habitat. However, efficacy of video monitoring technology is limited as the technology cannot track the pet if the pet leaves the planned habitat. In another monitoring method, a microchip is implanted under the skin of the pet. The implanted microchip cannot be lost or stolen. However, the microchip implanted in the internal tissues of the pet, may cause an inflammatory response or scar tissue around the microchip.

In other pet tracking devices, radio frequency transmitters may be employed that are configured to transmit signals to a portable unit carried by the owner. However, these devices are also prone to failure in notifying the pet owner when the pet becomes lost. The devices are configured to operate within a limited distance to exchange data between the radio frequency transmitters and the portable unit. If the pet is beyond the range, the devices cannot establish communications.

Accordingly, it is one object of the present disclosure to describe a system and methods for monitoring a pet that provide enhanced connectivity and transmission of data between a mobile device of a pet owner and a pet wearing a smart collar.

SUMMARY

In an exemplary embodiment, a system for monitoring a pet is described. The system includes a smart collar configured to surround a neck of the pet, a mobile computing device including a display screen, and a pet monitoring mobile application stored on the mobile computing device. The smart collar includes a global positioning receiver configured to receive a current location of the smart collar, a communications device, an organic light-emitting diode (OLED) display, a rechargeable battery, a microcontroller connected to the global positioning receiver, the OLED display and the communications device. The microcontroller is configured to: calculate a distance of a current location of the smart collar from a desired location, determine when the distance is greater than a first distance threshold, generate a communications packet including the current location, the perimeter, and the distance of the smart collar from the desired location, and transmit the communications packet. A mobile computing device is configured to receive the communications packet. The pet monitoring mobile application is configured to display the current location on the display screen of the mobile computing device.

In another exemplary embodiment, a method for monitoring a pet wearing a smart collar is described. The method includes storing a contact information of an owner of the pet in a memory of a microcontroller located in the smart collar. The method includes setting a perimeter enclosing a desired location of the pet by the microcontroller located in the smart collar. The method includes determining a current location of the smart collar by a global positioning receiver. The method further includes calculating a distance of a current location of the smart collar from the desired location by the microcontroller. The method further includes comparing the distance to a first distance threshold by the microcontroller. When the distance is greater than the first distance threshold, generating a communications packet including the contact information, the perimeter, the current location and the distance of the smart collar from the desired location. The method further includes transmitting the communications packet to a pet monitoring mobile application stored on a mobile computing device. The method further includes displaying the current location on a display screen of the mobile computing device.

In another exemplary embodiment, a non-transitory computer readable medium having instructions stored therein that, when executed by one or more processors, cause the one or more processors to perform a method for monitoring a pet wearing a smart collar is described. The method includes storing, in a memory of a microcontroller located in the smart collar, a contact information of an owner of the pet. The method includes setting, by the microcontroller located in the smart collar, a perimeter enclosing a desired location of the pet. The method includes determining, by a global positioning receiver, a current location of the smart collar. The method includes calculating, by the microcontroller, a distance of a current location of the smart collar from the desired location. The method includes comparing, by the microcontroller, the distance to a first distance threshold. The method includes when the distance is greater than the first distance threshold, generating a communications packet including the contact information, the perimeter, the current location and the distance of the smart collar from the desired location. The method includes transmitting the communications packet to a pet monitoring mobile application stored on a mobile computing device. The method includes displaying the current location on a display screen of the mobile computing device.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
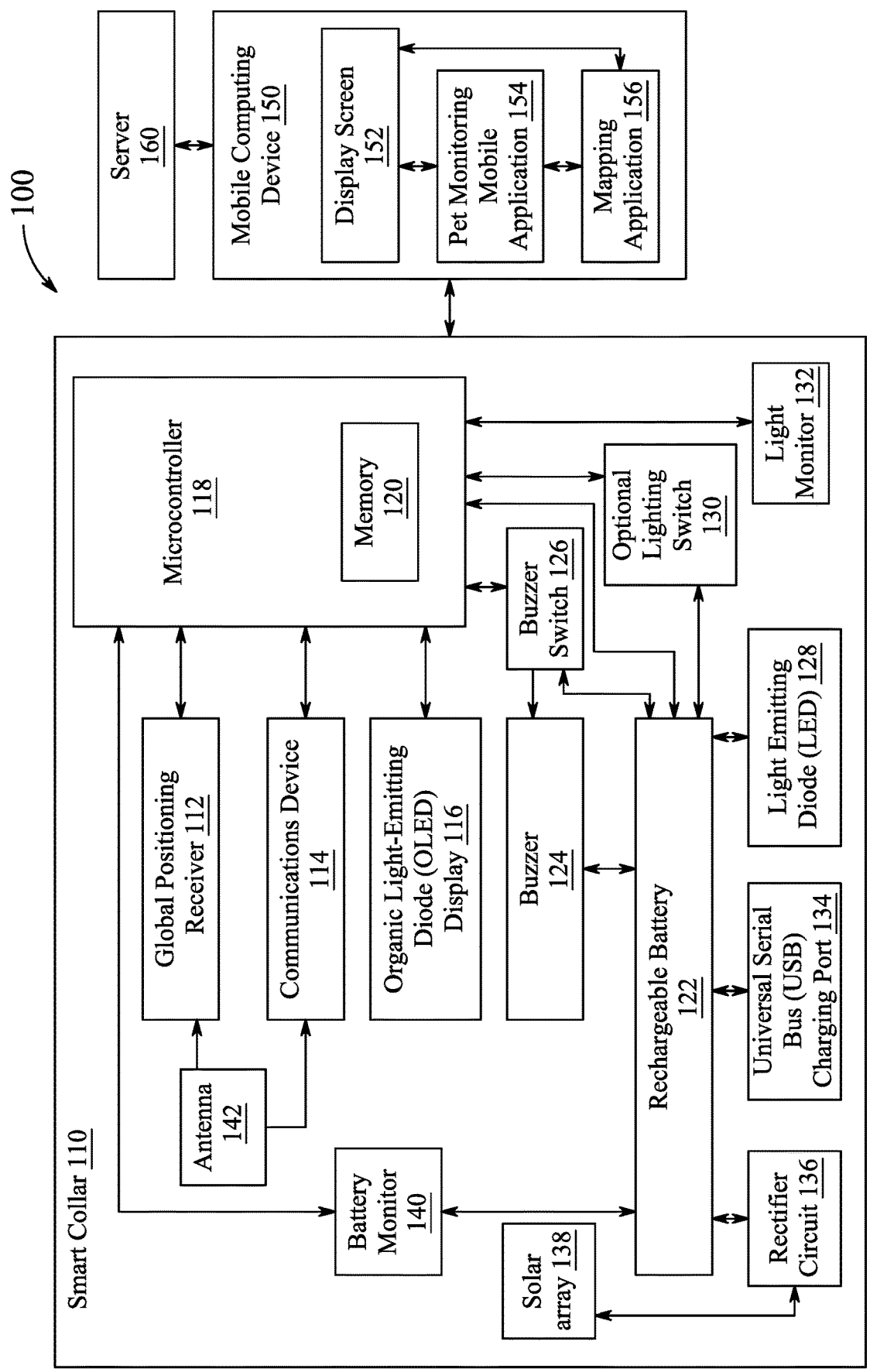
FIG. 1 illustrates a block diagram of a smart collar system for monitoring a pet, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for monitoring a pet. The system and method is implemented as a pet monitoring mobile application to assist pet owners to locate and track their pets anywhere and at any time. The pet monitoring mobile application measures a distance between the pet and the pet owner, generates an alarm if the pet goes beyond a predetermined distance, reminds the pet owner about pet's food schedule, and generates water and food alerts for the pet owner. The pet monitoring mobile application helps pet owners to track and find their pets in a time-saving manner.

In various aspects of the disclosure, non-limiting definitions of one or more terms that will be used in the document are provided below.

The term "state of charge (SoC)" refers to a measurement of an amount of energy available in a battery at a specific point in time expressed as a percentage. For example, the SoC reading for the battery might read 95% full or 10% full. The SoC provides information on how much longer the battery can perform before the battery needs to be charged or replaced. Use of the battery should be optimized such that the life of the battery can be increased. FIG. 1 illustrates a block diagram of a system 100 for monitoring a pet, according to aspects of the present disclosure. Referring to FIG. 1, the system 100 includes a smart collar 110, a mobile computing device 150 and a server 160. In an aspect, the smart collar 110, and the mobile computing device 150 are configured to exchange data with each other directly over a network or through the server 160. For example, the network may be a wired or wireless network (e.g., Bluetooth® networks, WLAN networks, WiFi, etc.).

The smart collar 110 is configured to surround the neck of the pet. It will be readily understood that alternative types of pet mounting devices or body-worn devices could be used in place of the smart collar 110. For example, a belt device could be worn around the midriff of the pet. Another example includes a bib or detachable harness that can be wrapped around the torso of the pet. These configurations would perform the same function as described herein with respect to the smart collar 110. The smart collar 110 may be a typical neck surrounding pet collar and may be made of any material, such as leather or woven fibers.

The smart collar 110 includes various electrical components such as a global positioning receiver 112, a communications device 114, an organic light-emitting diode (OLED) display 116, a microcontroller 118, a rechargeable battery 122, a buzzer 124, a buzzer switch 126, a light emitting diode (LED) 128, a lighting switch 130, an optional light monitor 132, a universal serial bus (USB) charging port 134, a rectifier circuit 136, a solar array 138, a battery monitor 140, and an antenna 142.

The various electrical components can be mounted on the smart collar 110 in any fashion, such as with a clip or some other fastening device provided therefor. For example, all of the components are housed and integrated into the smart collar 110. In one configuration, all of the components, including the rectifier circuit 136, the antenna 142, and the microcontroller 118, are contained within a small housing that can be woven or integrated directly into the smart collar 110. For example, the small housing is a waterproof housing.

The global positioning receiver 112 is configured to receive a current location of the smart collar 110. As the smart collar 110 surrounds the neck of the pet, the global positioning receiver 112 receives the current location of the pet. The global positioning receiver 112 is configured to receive signals from multiple satellites and calculate the position of the global positioning receiver 112 based on the signal data. In an aspect, the smart collar 110 may include a positioning unit, such as a device (global navigation satellite system (GNSS) receiver, beacon receiver, general packet radio service (GPRS) or the like) that receives electromagnetic signals transmitted from a satellite or positioning devices, and determines position information (latitude, longitude, altitude, coordinates, and so forth). In examples, the positioning unit may include a gyro sensor, an acceleration sensor, and the like, to aid the positioning unit in precisely determining the position, direction of movement, orientation and the like.

The communications device 114 is communicably coupled to the global positioning receiver 112 and receives the current location of the smart collar 110. In an aspect, the communications device 114 is configured to preprocess the received data before transmitting the data to the antenna 142 and the mobile computing device 150. In an example, the communications device 114 is configured to apply one or more techniques selected from formatting, masking, compressing, or encoding the data to generate a preprocessed data. In some examples, the communications device 114 is configured to periodically transmit a radio frequency signal that includes data to be transmitted. In an aspect, the communications device 114 is configured as a transmitter and a receiver. The communications device 114 may include a wireless-frequency transceiver having a variable gain amplifier that generates radio-frequency signals for transmission. A wireless amplifier circuit may be used to amplify the radio-frequency signals at the output of the variable gain amplifier for transmission through a plurality of antennas. The antenna 142 is located within the smart collar 110. The global positioning receiver 112 and the communications device 114 are connected to the antenna 142. The global positioning receiver 112 receives signals from the GPS satellites via the antenna 142.

The microcontroller 118 is connected to the global positioning receiver 112, the communications device 114, and the OLED display 116. The microcontroller 118 includes a memory 120. The memory 120 is configured to store program instructions. In an aspect, the memory 120 is configured to store a contact information of the pet owner. The memory 120 is configured to store preprocessed data, a desired location, a first distance threshold indicating a distance from the desired location up to the smart collar, and a second distance threshold indicating a distance of the smart collar from the mobile computing device 150. In examples, the user can change a first distance threshold and a second distance threshold based on limits defined by a manual or datasheets according to his convenience and requirements. In another aspect, the memory 120 is configured to store a plurality of media files such as voice alerts, messages, etc. The memory 120 may include any computer-readable medium known in the art including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

The microcontroller 118 is configured to cooperate with the memory 120 to fetch and execute computer-readable instructions stored in the memory 120. According to an aspect of the present disclosure, the microcontroller 118 may be implemented as one or more microprocessors, microcomputers, microcontrollers, digital signal processors, central processing units, state machines, logic circuitries, and/or any devices that manipulate signals based on operational instructions.

The microcontroller 118 is configured to receive the current location of the smart collar 110 from the global positioning receiver 112. Using the current location, the microcontroller 118 calculates a distance between the current location of the smart collar 110 and the desired location stored in the memory 120. In an aspect, the desired location is a location that is entered by the pet owner, and stored in the memory 120. For example, the desired location may be a home of the pet owner. The desired location may indicate a location where the pet resides or known to spend time. In an aspect, the pet owner may store a number of desired locations in the memory 120, such as locations of frequently visited places (parks, stadiums, office, etc.).

The present system 100 is configured to operate under two location scenarios: when the smart collar 110 resides in a defined proximity to the desired location (within the first distance threshold) or when the smart collar 110 is beyond the defined proximity to the desired location, and when the smart collar 110 is in a proximity of the mobile computing device 150 (within the second distance threshold) but not within the defined proximity to the desired location. For example, if the pet has left the desired location and is wandering, the smart collar 110 and the mobile computing device 150 establish communications, which let the pet owner know the location of the pet. When the mobile computing device 150 is within a threshold distance of the smart collar 110, the LED 128 on the smart collar 110 may flash, the buzzer 124 may sound, and the pet monitoring mobile application 154 may open to a page which shows the pet location.

When the smart collar 110 resides in the proximity of the desired location, the microcontroller 118 is configured to compare the current location of the smart collar 110 with the desired location provided by the user. The microcontroller 118 is configured to determine whether the compared distance is greater than the first distance threshold, fetched from the memory 120, or not. When the distance is greater than the first distance threshold, the microcontroller 118 is configured to generate a communications packet including the current location, the perimeter, and the distance of the smart collar 110 from the desired location. Using the communications device 114 and the antenna 142, the microcontroller 118 transmits the communications packet to the pet monitoring mobile application 154 stored on the mobile computing device 150 over the network.

The OLED display 116 is configured to display a specific message such as "Pet is lost" or "Lost Pet, PLEASE CALL (XXX) XXX-XXXX." The smart collar 110 may include a display unit, such as a LED matrix, small video display, high-resolution liquid crystal display (LCD), plasma, light-emitting diode (LED), or other devices suitable for displaying the specific message. The OLED display 116 may be flat or curved so as to conform with a curvature of the smart collar 110.

The buzzer 124 is located on an outer surface of the smart collar 110. The buzzer switch 126 is connected to the buzzer 124 and is actuated by the microcontroller 118 to turn on and turn off the buzzer 124 as appropriate. The buzzer 124 is configured to generate an alarm for a set period of time, or until the buzzer switch 126 is pressed manually or remotely. When the microcontroller 118 determines that the compared distance is greater than the first distance threshold, then the microcontroller 118 is configured to connect the buzzer switch 126 to the rechargeable battery 122 to actuate the buzzer 124. The microcontroller 118 may actuate the buzzer 124 intermittently during this time to save battery life. When the microcontroller 118 detects the proximity of the mobile computing device 150, the buzzer 124 will turn on continuously to help the pet owner auditorily locate the pet.

In a particularly preferred embodiment the smart collar has a thickness to width ratio of 0.5-10 to 2-5. The thickness of the collar is preferably such that the buzzer 124 penetrates the entire thickness thereof and protrudes from both an inside surface of the smart caller in contact with the pet and an outside surface of the smart collar exposed opposite the inside portion. In this configuration mechanical activity related to triggering of the buzzer functions to inform the pet by direct physical tactile contact between the pet (or the fur of the pet) and the buzzer as well as an individual or a second device in contact with the portion of the buzzer protruding from the outer surface of the smart collar. More preferably, the portion of the smart collar into which the buzzer is mounted is preferably separated from other portions of the smart collar by sections of woven material of the same width and thickness as that of the smart collar. These sections are molded and/or embedded in the smart collar to form a continuous smart collar length. The woven portions function to isolate and dampen vibrations from the buzzer and thereby provide protection and isolation vibration sensitive components such as the GPS device from the buzzer's mechanical energy. For example, the buzzer may be inserted and fully penetrate the thickness of the smart collar at a midpoint of the width of the smart collar. The mesh or woven portions of smart collar are located at a distance of approximately one width from the point of penetration of the buzzer through the smart collar in either direction along the longitudinal axis of the smart collar.

The LED 128 is located on the outer surface of the smart collar 110. The LED 128 is configured to emit light spontaneously. In an example, the smart collar 110 may include one or more LEDs. In an example, the LED 128 may provide white and/or colored light. In some examples, the LED 128 may provide a steady, a blinking, and/or a strobing light. The rechargeable battery 122 is electrically connected to the LED 128 by the lighting switch 130. The lighting switch 130 is configured to turn on and turn off the LED 128.

When the compared distance is greater than the first distance threshold, the microcontroller 118 is configured to retrieve the contact information from the memory 120. The microcontroller 118 is configured to display a lost pet message and the contact information on the OLED display 116. Simultaneously, the microcontroller 118 connects the buzzer switch 126 to the rechargeable battery 122 to actuate the buzzer 124, resulting in turning on the buzzer 124 to generate the alarm. The alarm generated by the buzzer 124 serves to alert those searching for the pet that the pet is outside of the desired location and should be apprehended.

The microcontroller 118 is also connected to the LED 128. When the distance is greater than the first distance threshold, the microcontroller 118 is configured to generate drive signals that actuate the LED 128. After receiving the drive signals, the LED 128 starts flashing. The alarm and the LED 128 serve to guide the pet owner or a person searching for the pet to the pet's location.

In an aspect, the microcontroller 118 is configured to receive the location coordinates of the mobile computing device 150 using the communications device 114. Further, the microcontroller 118 detects a proximity distance of the smart collar 110 from the mobile computing device 150 by comparing the current location of the smart collar 110 with the received location coordinates of the mobile computing device. In comparison, when the detected proximity distance is less than the second distance threshold, the microcontroller 118 is configured to actuate the buzzer switch 126 to connect the rechargeable battery 122 to the buzzer 124, resulting in the buzzer 124 turning on to generate the alarm. Also, the microcontroller 118 is configured to display a lost pet message and the contact information on the OLED display 116. Simultaneously the microcontroller 118 generates drive signals that actuate the LED 128. After receiving the drive signals, the LED 128 starts flashing. In an example, the LED 128 may be on all of the time but may start flashing when the pet leaves the desired location. In an example, the LED 128 may be on all of the time but may start flashing when the mobile computing device comes near the smart collar 110. In some embodiments, the microcontroller 118 may increase the duty cycle of the flashing of the LED 128 depending upon the proximity distance from the mobile computing device 150. For example, when the mobile computing device 150 is near the pet, the LED 128 may flash frequently. Similarly, depending upon the proximity distance from the mobile computing device 150, the volume of the buzzer 124 may be scaled up or down. In an example, if the pet owner is close to the smart collar 110, then based on the proximity distance, the microcontroller 118 is configured to increase the volume of the alarm and the flashing rate of the LED 128 to guide the pet owner to the pet. In an example, the microcontroller 118 may increase an intensity level, flash duty cycle, buzzer duty cycle, etc., when the smart collar 110 is near the mobile computing device 150 when the pet owner is searching for the lost pet.

The smart collar 110 includes a rechargeable battery 122 configured to provide power to electrical components of the smart collar 110. In an example, the rechargeable battery 122 includes, but is not limited to a non-aqueous lithium-ion battery, a polymer lithium-ion battery, a sodium sulfate battery, a silver-zinc (AgZn) battery, a lithium-ion battery, a nickel metal hydride battery, or other rechargeable battery.

The optional light monitor 132 may be connected to the smart collar 110. The optional light monitor 132 is configured to detect an intensity of ambient light at the smart collar 110, and generate a lighting signal when the intensity of the ambient light falls below a light threshold. In an operative aspect, the microcontroller 118 is connected to the LED 128, the lighting switch 130 and the optional light monitor 132. The microcontroller 118 is further configured to receive the lighting signal from the optional light monitor 132 and actuate the lighting switch 130 to connect the rechargeable battery 122 to the LED 128 when the intensity of the ambient light falls below the light threshold, and the distance is greater than the first distance threshold.

The solar array 138 is located on an outer surface of the smart collar 110. The solar array 138 is configured to generate an electric current when the smart collar 110 is exposed to sunlight. The rectifier circuit 136 is located within the smart collar 110. The rectifier circuit 136 is connected to the solar array 138. The rectifier circuit 136 is configured to convert the electric current to a direct current. The rechargeable battery 122 is connected to the rectifier circuit 136 and recharged by the direct current.

The battery monitor 140 is connected in parallel with the rechargeable battery 122 and connected in series with the microcontroller 118. The battery monitor 140 is configured to transmit a battery SoC to the microcontroller 118. The microcontroller 118 is configured to include the battery SoC in the communications packet. In an aspect, the smart collar 110 includes a USB charging port 134. The USB charging port 134 is located on the smart collar 110. The USB charging port 134 is configured to connect to a power supply cable. The USB charging port 134 supplies current from the power supply cable to the rechargeable battery 122. The microcontroller 118 is further configured to determine when the SoC is below a threshold SoC, and show a low battery indication on the OLED display 116.

In an example, if the battery SoC is greater than a threshold value, the smart collar 110 is configured to transmit the communications packet continuously, thereby providing real-time pet monitoring. In one aspect, if the battery SoC is less than a threshold value, then to enhance the life span of the rechargeable battery, the smart collar 110 is configured to operate in a power-saving mode. In the power-saving mode, the smart collar 110 transmits the communications packet periodically after a predefined interval of time. In an example, the smart collar 110 is configured to transmit the communications packet in a store and forward manner.

The mobile computing device 150 includes a display screen 152, the pet monitoring mobile application 154, and a mapping application 156. The mobile computing device 150 is configured to receive the communications packet from the smart collar 110. In some examples, the mobile computing device 150 includes communication capabilities (e.g., through cellular, Bluetooth, hotspot and/or Wi-Fi), allowing communication with other devices and/or a centralized server. For example, and without limitation, the mobile computing device 150 may refer to a mobile device, PDA, desktop computer, GPS device, automotive navigation system, wearable object, a cellular telephone, a tablet, a netbook, a wireless terminal, a laptop computer, a wearable computer device, or any other device.

The pet monitoring mobile application 154 is stored on the mobile computing device 150. The pet monitoring mobile application 154 is configured to display the current location on the display screen 152 of the mobile computing device 150. In some examples, the pet monitoring mobile application 154 may be a software or a mobile application from an application distribution platform. Examples of application distribution platforms include the App Store for iOS provided by Apple, Inc., Play Store for Android OS provided by Google Inc., and such application distribution platforms.

In an example, the pet monitoring mobile application 154 may seek information from the mobile computing device 150. For example, the information may include access permission (e.g., permission to access an address book, permission to use location information, permission to access a gallery, and the like). Further, the pet monitoring mobile application 154 is configured to obtain location coordinates of the mobile computing device 150. The pet monitoring mobile application 154 is configured to share the obtained location of the mobile computing device with the smart collar 110. The mobile computing device 150 may obtain an estimate of its location by acquiring and measuring wireless signals from a satellite positioning system (SPS), such as the GPS or other like Global Navigation Satellite Systems (GNSS) and from cellular base stations.

The mobile computing device 150 receives the communications packets from the smart collar 110 and analyzes the received communications packets. Further, the pet monitoring mobile application 154 is configured to extract various details such as current location, the perimeter, and the distance of the smart collar 110 from the desired location and battery SoC from the received packets. In an example, the mobile computing device 150 is configured to determine the current location of the smart collar with respect to the current location the mobile computing device 150. After extracting the various details, the pet monitoring mobile application 154 is configured to display the SoC on the display screen 152 of the mobile computing device 150.

The mapping application 156 is stored on the mobile computing device 150. The mapping application 156 is set up to generate a map based on the extracted information, such as the smart collar 110's current location, perimeter, and distance from the desired location. The mapping application 156 is configured to render the map on the display screen 152 of the mobile computing device with the current location of the smart collar 110 with respect to the location of the mobile computing device 150. In an aspect, the pet monitoring mobile application 154 is configured to exchange data with the pet monitoring mobile application 154 installed on a different mobile computing device 150. In an example, the mapping application 156 is configured to highlight all the users who have installed the pet monitoring mobile application 154 on their devices and within a region near the current location of the smart collar 110. For example, based upon location, if the pet is lost, then the pet monitoring mobile application 154 is configured to send push messages to all the mobile computing devices having the pet monitoring mobile application 154. In an implementation, the pet monitoring mobile application 154 is configured to connect with the server 160. The server 160 is configured to store data corresponding to the pet monitoring mobile application 154, such as travel history of the pet, last saved food schedules, last reminders, contact details of the pet owner, etc.

In some examples, the server 160 is a server operating system, such as Windows Server or Linux, which acts as the platform that enables applications to run. In an example, the server can be implemented as one or more microprocessors, microcomputers, microcontrollers, digital signal processors, state machines, logic circuitries, and/or any devices that manipulate signals based on operational instructions. In some examples, the server 160 may be implemented as any type of computing device for hosting a webpage or website accessible via the network, such as, but without limitation, a web server, application server, cloud server, or other host. In an example, the server 160 can customize the pet monitoring mobile application 154 according to country requirements. For example, the date and phone format may be changed according to corresponding countries.

Figure 2:
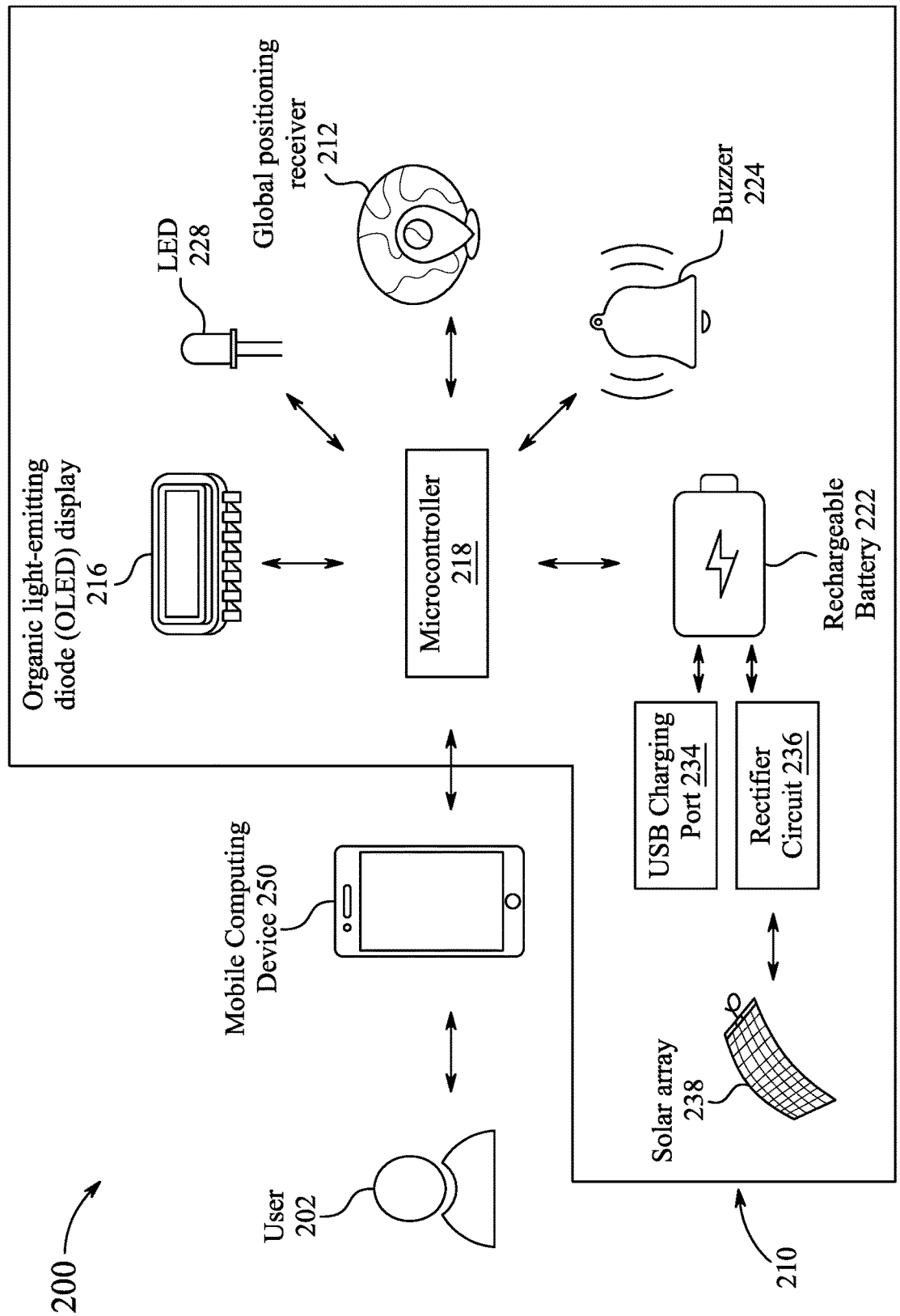
FIG. 2 illustrates a practical implementation of the smart collar system for monitoring the pet, according to aspects of the present disclosure.

FIG. 2 illustrates a practical implementation of the system 200 for monitoring the pet, according to aspects of the present disclosure.

The mobile computing device 250 includes a display screen 152, a pet monitoring mobile application 154, and a mapping application 156 as shown in FIG. 1 The mobile computing device 250 is configured to receive the communications packet from the smart collar 210.

The smart collar 210 includes an OLED display 216, a microcontroller 218, a global positioning receiver 212, an LED 228, a buzzer 224, a rechargeable battery 222, a USB charging port 234, a rectifier circuit 236, and a solar array 238. The construction of smart collar 210 is substantially similar to that of the smart collar 110, and thus the construction is not repeated here in detail for the sake of brevity.

The global positioning receiver 212 is configured to receive a current location of the smart collar 210. The global positioning receiver 212 is configured to operate with a DC input in a range of 3.3 V— to 5V. For example, a GPS antenna is used with the global positioning receiver 212. In an example, the GPS antenna is a patch antenna.

In an operative example, the present system 200 is configured to determine a distance of the pet from the desired location and from the mobile computing device 250. In an example, the present system 200 is configured to operate in two ways:

Case 1: When the pet is residing at the desired location (within the area defined by the perimeter), using the pet monitoring mobile application, the present system 200 is configured to perform the following steps:
  I. Set a perimeter threshold, and a first distance threshold from the desired location.
  II. Get GPS coordinates of the smart collar 210.
  III. Track the current location of the pet on the pet monitoring mobile application.
  IV. Calculate a distance between the desired location and the current location of the smart collar 210 using a haversine formula. The haversine formula determines a great-circle distance between two points on a sphere using the longitudes and latitudes of the points.
  V. If the calculated distance>a first distance threshold, the microcontroller 218 activates the buzzer 224, the LED 228 and also displays lost pet message on the OLED display 216 of the smart collar 210.
  VI. If the calculated distance<the first distance threshold, no action is performed by the microcontroller 218. Further, if the pet is brought back within the first distance threshold after the buzzer 224, LED 228 had been activated, and the lost pet message is displayed on OLED, the pet monitoring mobile application deactivates the buzzer 224, the LED 228, and the OLED display 216 of the smart collar 210.

In an aspect, the smart collar 210 is also configured to monitor the location of the pet with respect to the desired location. In such case, the smart collar 210 using the microcontroller 218 is configured to compare the current location of the smart collar 210 with the desired location provided by the user 202. The microcontroller 218 is configured to determine whether or not the compared distance is greater than the first distance threshold, fetched from the memory. When the distance is greater than the first distance threshold, the microcontroller 218 is configured to generate a communications packet including the current location, the perimeter, and the distance of the smart collar 210 from the desired location. The microcontroller 218 transmits the communications packet to the pet monitoring mobile application stored on the mobile computing device 250 over the network. Also, the microcontroller 218 activates the buzzer 224, the LED 228, and displays a lost pet message on the OLED display 216 of the smart collar 210.

Case 2: When the pet is outside the desired location, using the smart collar 210, the present system 200 is configured to perform the following steps:
  I. Get GPS coordinates of the mobile computing device 250.
  II. Get GPS coordinates of the smart collar 210.
  III. Calculate a distance between the mobile computing device 250 and the current location of the pet using the haversine formula.
  IV. If the calculated distance<a second distance threshold, a signal is sent from the mobile computing device 250 to the smart collar 210 to activate the buzzer 224 in a pattern, flash the LED 228, and display the lost pet message on the OLED display 216 and contact information of the pet owner on the smart collar 210.
  V. If the calculated distance>the second distance threshold, no additional actions are performed.

In some examples, if the pet is brought within the second distance threshold after the buzzer 224 and LED 228 have been activated, and the lost pet message is displayed on the OLED display 216, the user 202 is configured to deactivate the buzzer 224, the LED 228 and the OLED display 216 of the smart collar 210 by using the pet monitoring mobile application. In some example, the buzzer 224 is configured to generate the alarm until the user 202 turns the buzzer 224 off.

The present system 200 is configured to employ the haversine formula as given below:

$$\alpha = \sin^2(\Delta\varphi/2) + \cos\varphi_1 \cdot \cos\varphi_2 \cdot \sin^2(\Delta\lambda/2), c = 2 \cdot \operatorname{atan} 2(\sqrt{\alpha}, \sqrt{1-\alpha}), d = R \cdot c,$$

where $\varphi$ is latitude, $\lambda$, is longitude, R is earth's radius (mean radius=6,371 km). The angles are changed to radians before applying to trigonometric functions.

In an aspect, the microcontroller 218 is configured to detect whether the pet is inside the desired location or outside. For example, firstly, the microcontroller 218 is configured to measure the distance between the current location of the pet and the desired location. If the measured distance is less than the first distance threshold, the microcontroller 218 determines that the pet is inside the desired location. If the measured distance is greater than the first distance threshold, the microcontroller 218 is configured to activate the buzzer 224, the LED 228, and also display a lost pet message on the OLED display 216 of the smart collar 210. When the pet owner is searching for the lost pet using the mobile computing device 250, the microcontroller 218 is configured to detect the proximity distance of the smart collar 210 from the mobile computing device 250.

When the measured distance is greater than the first distance threshold, the microcontroller 218 establishes communications with the pet monitoring mobile application stored on the mobile computing device 250. The pet monitoring mobile application determines the proximity distance of the mobile computing device 250 from the smart collar. If the smart collar is determined to be within a proximity distance of the mobile computing device which is greater than the second distance threshold but less than a third distance threshold greater than the second distance threshold the microcontroller 218 is configured to increase the volume of the buzzer 224 and the blinking rate of the LED 228 to guide the pet owner to the pet. If the smart collar is determined to be at a distance from the mobile computing device 250 which is greater than the third distance threshold, the pet monitoring mobile application displays the GPS location of the smart collar on map. In this case, the buzzer returns to an intermittent buzzer pattern and the LED stays on but does not flash in order to save the battery.

In an example, the pet monitoring mobile application 154 may also be configured to send a notification to the smart collar 210 indicating that the pet is outside or inside the desired location. In some examples, the pet owner may be configured to change a setting in the pet monitoring mobile application 154 and the smart collar 210 in response to the change in the location (outside or inside the desired location).

In an aspect, the microcontroller 218 is an NodeMCU (Node MicroController Unit) ESP8266 (designed and manufactured by Espressif Systems, located at #204, Block 2, 690 Bibo Road, Shanghai). For example, the NodeMCU acts as a base for the collar hardware, which is interconnected to the other components of the smart collar 210.

The OLED display 216 is configured to display the message. In an example, the message may be a "lost pet" message or the contact detail of the pet owner. The OLED display 216 has a number of advantages such as high brightness, self-emission, high contrast ratio, slim outline, wide viewing angle, wide temperature range, and low power consumption.

The buzzer 224 is configured to be activated by the microcontroller 218 and generate an alarm. The LED 228 is a semiconductor light source. As current passes through the LED 228, the LED 228 produces light. The LED 228 is configured to be activated by the microcontroller 218 if the pet is lost or exceeds the distance limit. The LED 228 is configured to blink to grab attention of the people nearby. The alarm and the LED 228 serve to guide the pet owner or a person searching for the pet to the pet's location.

The rechargeable battery 222, also known as a backup battery or a secondary cell, is an electrical battery that can be charged, discharged, and recharged several times. The rechargeable battery 222 provides power to electrical components of the smart collar 210.

The solar array 238 is configured to generate electric current when the smart collar 210 is exposed to sunlight. The rectifier circuit 236 is located within the smart collar 210. The rectifier circuit 236 is connected to the solar array 238. The rectifier circuit 236 is configured to convert the electric current to a direct current. The rechargeable battery 222 is connected to the rectifier circuit 236 and is configured to be recharged by the direct current.

Further, the smart collar 210 may include a plurality of resistors that are used to secure, operate, or regulate current in an electric circuit. In the present disclosure, the plurality of resistors is employed as a voltage divider for the battery to be able to monitor the rechargeable battery 222, and with the LED 228 to ascertain that the high voltage will not damage the rechargeable battery 222.

FIGS. 3A-3H represent user interfaces of the pet monitoring mobile application. The pet monitoring mobile application 154 is configured to generate a plurality of pages on the display screen 152 of the mobile computing device 150. For example, the plurality of pages include a home page, a registration page, a login page, a pet tracking page, a set button, a lost and found page, a feeding page, and a battery status page.

Figure 3B:
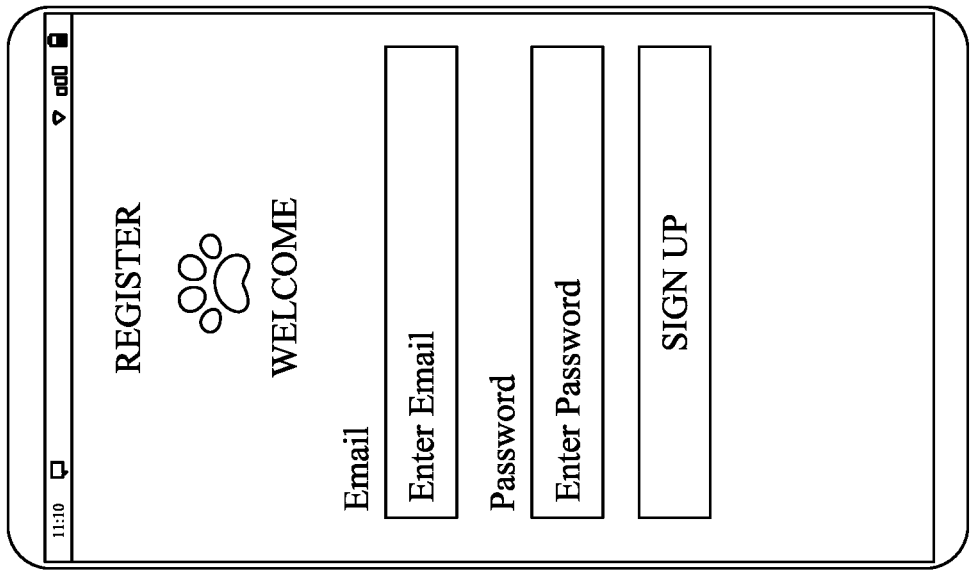
FIG. 3B is a user interface page providing a registration page for the pet monitoring mobile application, according to aspects of the present disclosure.
Figure 3A:
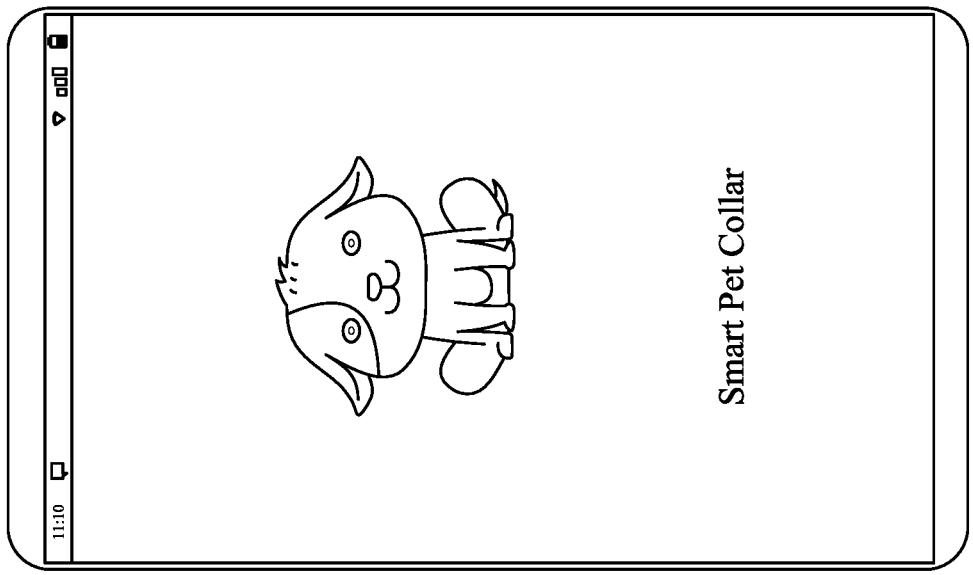
FIG. 3A is a user interface page showing an exemplary home page of a pet monitoring mobile application, according to aspects of the present disclosure.

FIG. 3A represents an exemplary home page 302 of the pet monitoring mobile application 154. The home page 302 is configured to introduce the pet monitoring mobile application 154 to the user (pet owner). The home page 302 informs the user what steps can be performed next and supports the user to explore many other pages.

FIG. 3B illustrates a user interface that shows registration page 304 of the pet monitoring mobile application 154, according to aspects of the present disclosure. The registration page 304 appears when the pet owner initiates the pet monitoring mobile application for registration. The registration page 304 does not appear after the user has registered through the mobile computing device 150. The registration page 304 prompts the pet owner to create a profile through a 'signup' option. On selecting the signup option, the registration page 304 includes options that prompt user information such as name, age, address, email address, password, contact number, and like. The registration page 304 provides a step-by-step function for registering an account, and creating an account. The registration page 304 receives the name and address of the pet owner, the contact information of the pet owner, the desired location of the pet, the perimeter enclosing the desired location of the pet, and a feeding schedule for the pet. In one example, the perimeter may be defined by default, such as 25 meters around the desired location. The pet monitoring mobile application 154 may provide the option to modify the default perimeter and/or set a new perimeter. In some examples, the pet owner can draw the perimeter with his finger on the display screen 152 of the mobile computing device 150. In some examples, the perimeter may not necessarily be a circle, but can be defined for an enclosed area of his yard. For example, the perimeter can have a circular shape, a rectangular shape, a closed curve shape or any shape drawn by the pet owner. The perimeter is set on the pet monitoring mobile application, and may be a geo-fence, as GPS is used to determine the distance. In some examples, the registration page 304 is configured to analyze existing applications such as the email application, messages, existing profile information in the mobile computing device 150, and/or other information to obtain the user information.

Figure 3D:
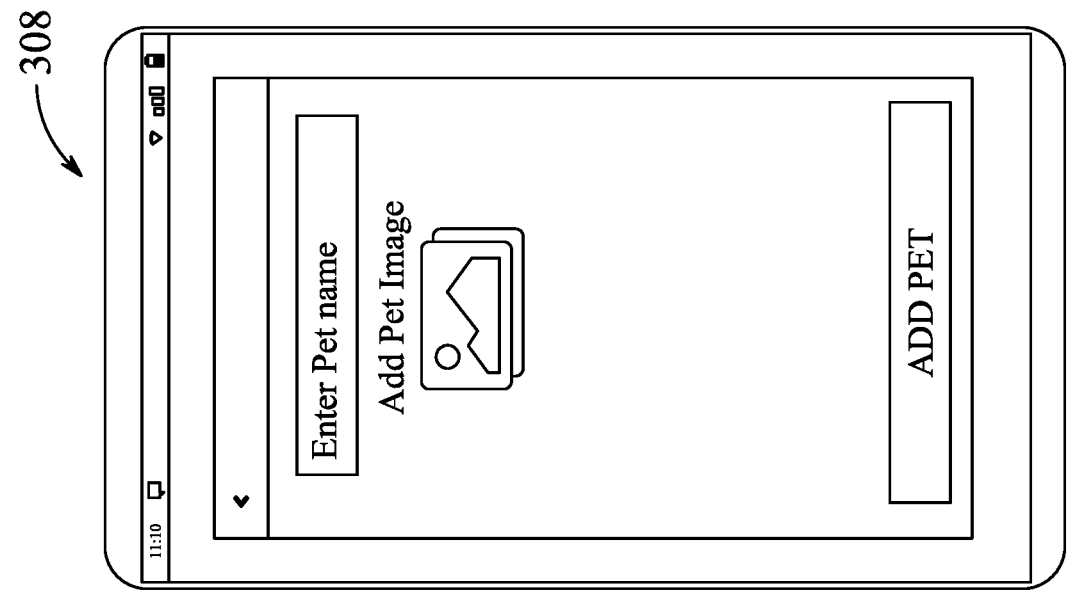
FIG. 3D is a user interface page illustrating a profile tab having information about a pet of the pet monitoring mobile application, according to aspects of the present disclosure.
Figure 3C:
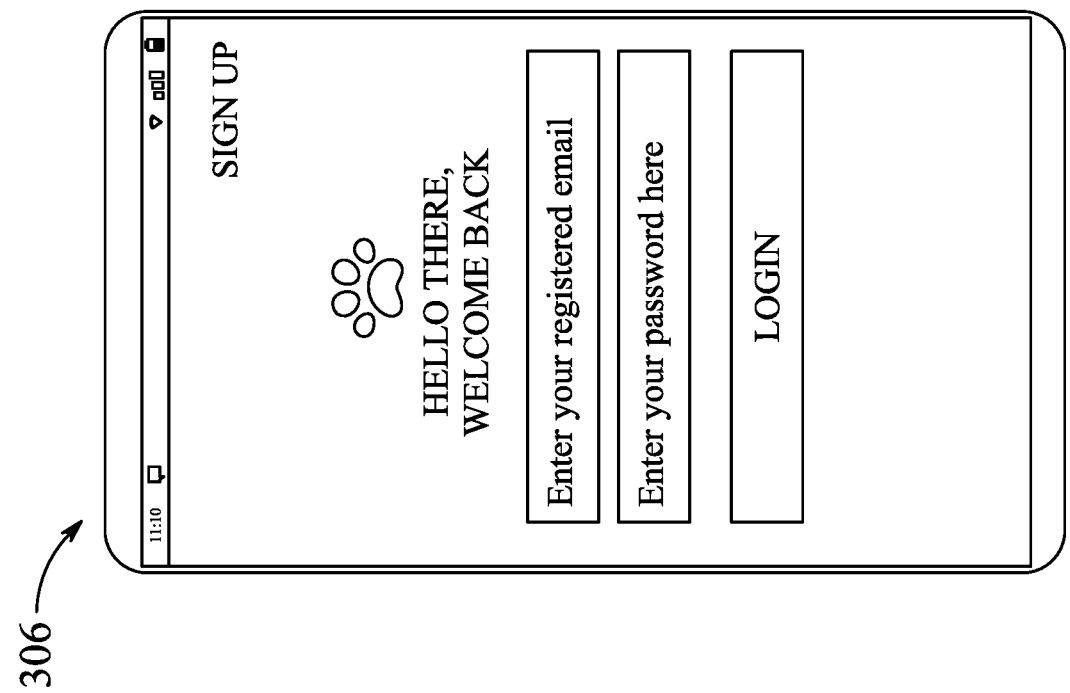
FIG. 3C is a user interface page for logging in to the pet monitoring mobile application, according to aspects of the present disclosure.

FIG. 3C is a user interface representing a login page 306 of the pet monitoring mobile application 154, according to aspects of the present disclosure. The login page 306 is configured to ask the pet owner to provide user credentials (e.g., user identifier (ID), password, etc.), which were established during the registration process. In response, the pet owner may provide such user credentials through the login page 308, which verifies the details. The login page 306 may include a user information section for receiving input related to user login information. In various example, the user information section includes a username section, a password section, and a login button. The username section may include a text box for receiving input that specifies a username. The password section may include a text box for receiving input that specifies a password. The login button may be clicked by a user to start a login process in which the username entered in the username section, and the password entered in the password section are transmitted to a remotely placed server for verification. In some examples, biometric-based login may be implemented, and a corresponding user interface may be provided on the login page 306 prompting the user to provide biometric input. Some examples of biometric input may include, but are not limited to, facial image input, iris input, fingerprint input, and auditory input.

FIG. 3D is a user interface illustrating a profile tab 308 seeking information about a pet to be monitored through the pet monitoring mobile application 154, according to aspects of the present disclosure. The profile tab 308 is configured to request the pet owner to make a pet profile of a pet which is to be monitored. In an aspect, the pet owner can make a plurality of pet profiles corresponding to a plurality of pets. In an example, each pet profile is assigned with a unique number. The pet profile includes name of a pet, age of a pet, color of a pet, contact number of the pet owner, desired location, emergency contact number, and images of the pet. In some examples, the pet owner may be provided with options to input data regarding the breed, age, gender, health conditions, etc., of the pet. In an aspect, the pet monitoring mobile application 154 may also be configured to receive or track various alternative information, such as an activity level, a feeding schedule, and a watering schedule, which can then be associated with the pet profile.

Figure 3F:
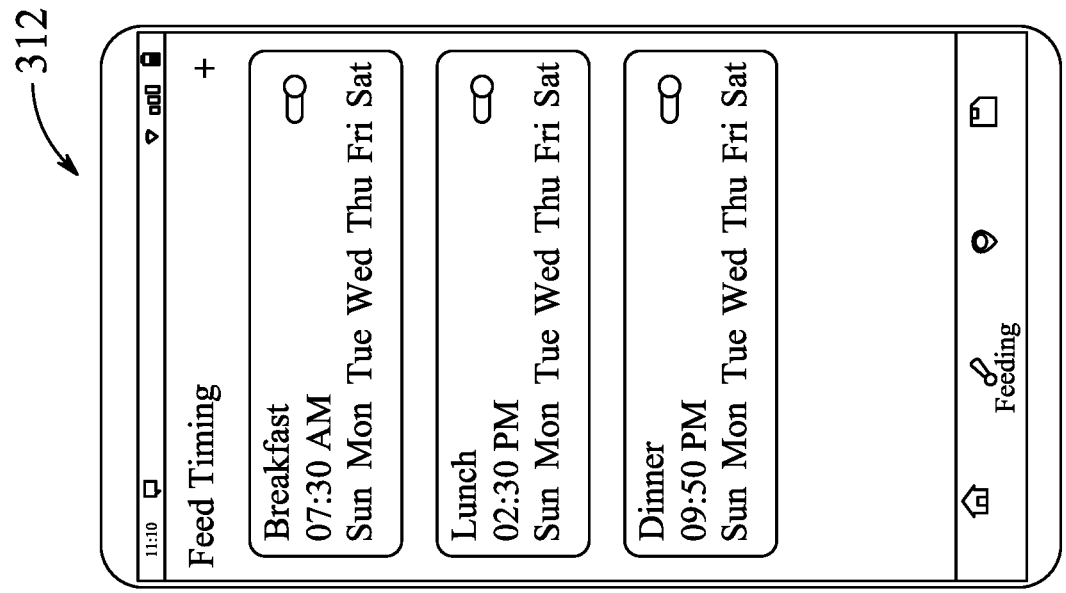
FIG. 3F is a user interface page illustrating a feeding page of the pet monitoring mobile application, according to aspects of the present disclosure.
Figure 3E:
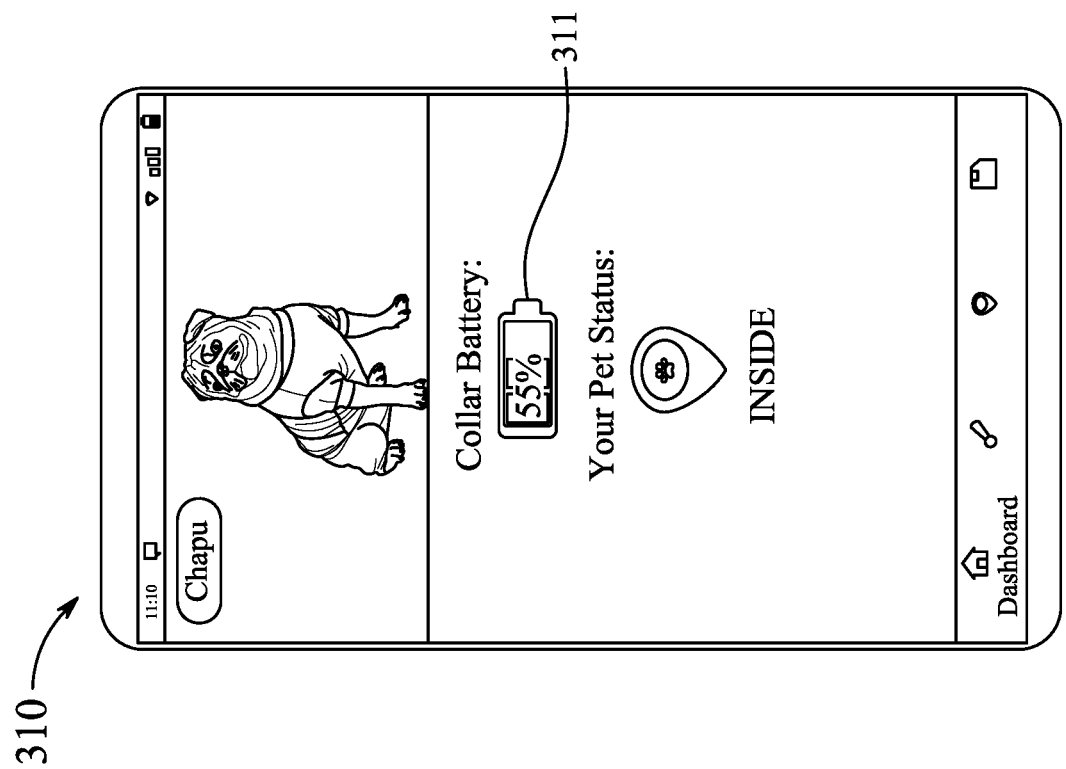
FIG. 3E is a user interface page showing a battery status of the smart collar through the pet monitoring mobile application, according to aspects of the present disclosure.

FIG. 3E represents the battery status page 310 of the pet monitoring mobile application 154, according to aspects of the present disclosure. The pet monitoring mobile application 154 is configured to receive the communications packet from the smart collar 110. The communications packet includes the battery SoC. The battery status page is configured to display the SoC of the battery and indicate when the battery is in a charging mode. In an example, the battery status 311 may be shown as a bar graph or may be shown in a text readout on the battery status page 310.

FIG. 3F is a user interface page illustrating a feeding page 312 of the pet monitoring mobile application 154, according to aspects of the present disclosure. The feeding page 312 is configured to display a feeding schedule. The feeding schedule includes a quantity of food for each feeding of the day, the time of the feeding, the total number of feedings in the day, and the time of refilling water to the pet. The feeding page 312 is configured to suggest the quantity of food for each feeding of the day based upon the age, breed, activities and the like, of the pet. The feeding page 312 is configured to generate a notification when it is time to feed the pet.

Figure 3H:
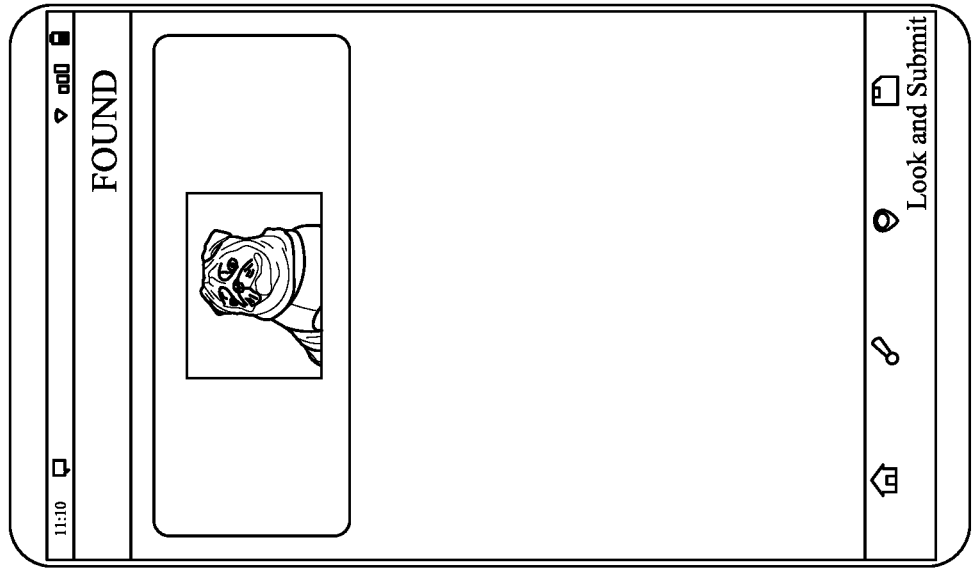
FIG. 3H is a user interface for a lost and found page in the pet monitoring mobile application, according to aspects of the present disclosure.
Figure 3G:
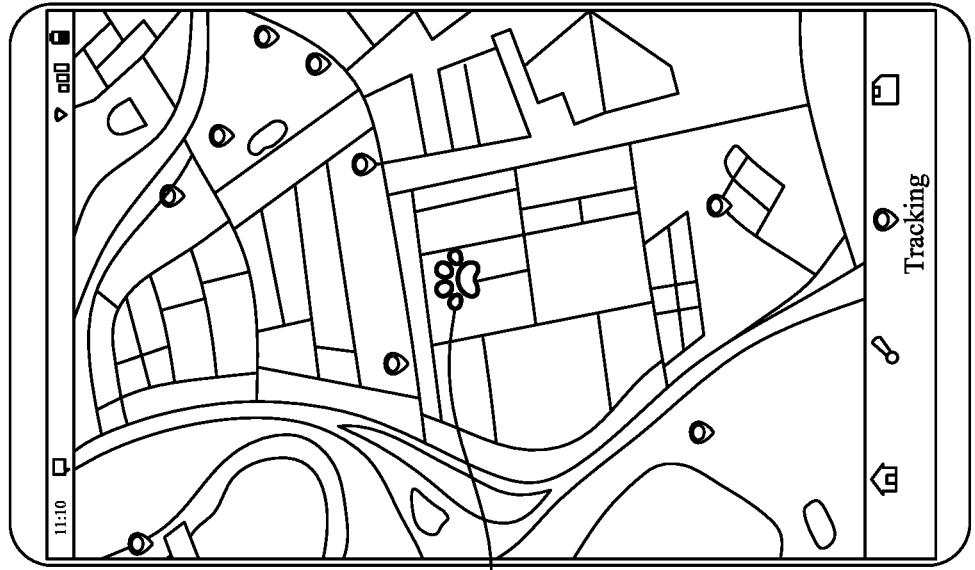
FIG. 3G is a user interface providing a location of the pet wearing the smart collar, according to aspects of the present disclosure.

FIG. 3G is a user interface view representing the pet tracking page 314 of the pet monitoring mobile application 154, according to aspects of the present disclosure. The pet tracking page 314 is configured to display the current location of the smart collar 110/210. In an aspect, the pet tracking page 314 is configured to display a distance between the current location of the smart collar 110/210 from the desired location. In examples, the pet tracking page 314 is configured to display a distance between the current location of the smart collar and location coordinates of the mobile computing device 150/250.

The pet tracking page 314 includes a map, specifically configured for the pet monitoring mobile application 154, or may use a map application that is already installed in the mobile computing device 150. As shown in FIG. 3G, a pet 315 wears the smart collar and the pet monitoring mobile application 154 is able to track a current position of the pet 315 based on the received communications packet. The pet tracking page 314 may obtain a geographical map associated with a position of the pet 315 via a satellite transmission or via GPRS or GPS. The pet tracking page 314 may overlap the position of the pet 315 with the geographical map to generate a composite map and display the composite map on the display screen 152. The pet owner may draw the first distance threshold via the user device on the composite map where the pet 315 is known to stay, or draw a set of boundaries to define the first distance threshold.

In an aspect, the pet tracking page 314 may be configured to provide zoom in, zoom out, overlaying a map, or overlaying a satellite image options. The nearest street address, direction of travel, and speed of travel data are also provided about the moving pet. Additional features may be provided, such as directions to the pet, time to get to a pet location, elapsed time since the pet left a safe zone, and others. In this case, a map is shown with street names and intersections. In an aspect, the pet tracking page 314 may provide a set button that is configured for updating the current position of the pet on the map.

FIG. 3H is a user interface that illustrates the lost and found page 316 of the pet monitoring mobile application 154, according to aspects of the present disclosure. The lost and found page 316 is configured to display lost and found pets within a set distance from the desired location. For example, based upon location, if the pet is lost, then the pet monitoring mobile application 154 is configured to send push messages to all the mobile computing devices having installed the pet monitoring mobile application 154 that are proximate to the location. In an aspect, the push message includes an image of the pet, and other information about the pet such as color, breed, height, etc. The lost and found page 316 of the pet monitoring mobile application 154 is configured to show details of the pets that are lost and found in the nearby location of the pet owner. In an example, when the pet is lost, the lost and found page 316 is configured to update and shows all the details of the lost pet to the user such that it will be easy to locate the lost pet in the community. FIG. 4A-FIG. 7 illustrate non-limiting examples of hardware units used for the smart collar to monitor a pet.

Figure 4A:
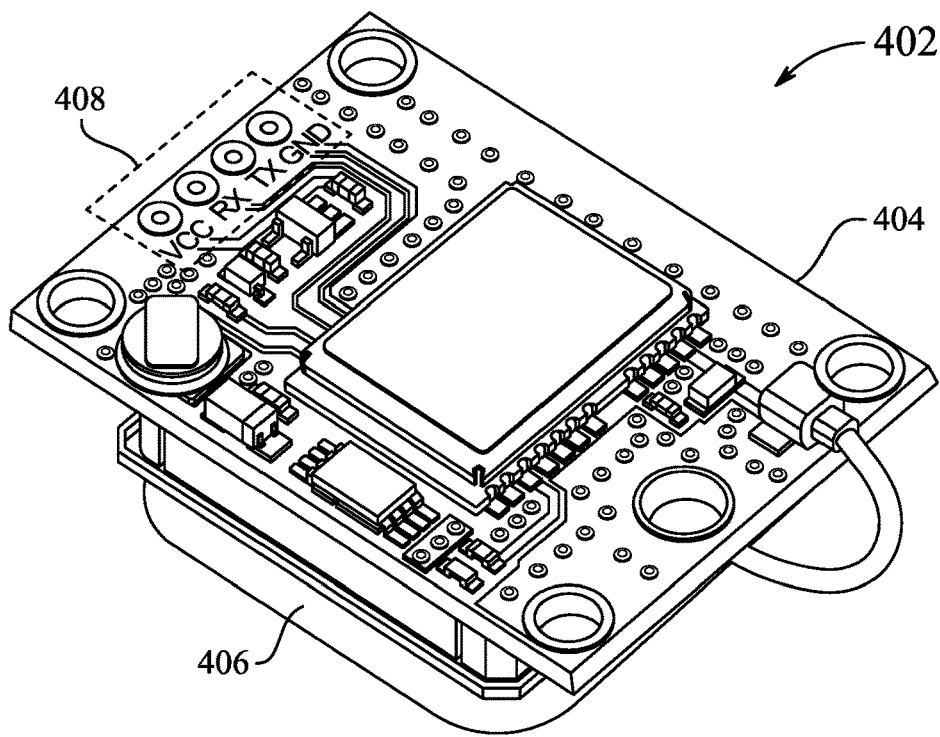
FIG. 4A illustrates a top view of a GPS unit, according to aspects of the present disclosure.

FIG. 4A illustrates a top view of a GPS unit 402, according to aspects of the present disclosure. The GPS unit 402 may be used for implementing the global positioning receiver 212. As shown in FIG. 4A, the GPS unit 402 includes a global positioning receiver 404 and a patch antenna 406. The global positioning receiver 404 is positioned over the patch antenna 406. In an example, the patch antenna 406 is a GPS (Global Positioning System) antenna, an SXM (Sirius XM) antenna, a GNSS (Global Navigation Satellite System) antenna, or the like that receives or transmits circularly polarized waves from broadcasting or communication satellites. In an example, the GPS unit 402 is a NEO-6M GPS unit (fabricated by u-blox AG, located at Zürcherstrasse 68, Thalwil, 8800 Switzerland). The NEO-6M GPS unit has high sensitivity for indoor applications. For example, the model number is NEO-6M-0-001 and has ROM/FLASH version is ROM 7.0.3 (PCN reference UBX-TN-11047-1). The NEO-6M unit includes one configurable Universal Asynchronous Receiver-Transmitter (UART) interface for serial communication, and the default UART Transistor-Transistor Logic (TTL) baud rate set is 9,600. The NEO-6MV2 is popularly used for navigation. The NEO-6MV2 determines its location on earth and provides output data which is a longitude and latitude of its position. The NEO-6MV2 is from a family of stand-alone GPS receivers featuring the high performance u-blox 6 positioning engine. These flexible and cost effective receivers offer numerous connectivity options in a miniature (16×12.2×2.4 mm) package. The compact architecture, power and memory options make NEO-6 modules ideal for battery-operated mobile devices with very strict cost and space constraints. Small structure, light weight and design aspects gives NEO-6MV2 excellent navigation performance even in challenging environments. The NEO-6MV2 has four pins (shown by reference number 408) having the configuration provided below in Table 1.

TABLE 1

NEO-6MV2 GPS unit Pin Configuration

| Pin Name | Description |
| --- | --- |
| VCC | Positive power pin |
| RX | UART receive pin |
| TX | UART transmit pin |
| GND | Ground |

Features and electrical characteristics of the NEO-6MV2 GPS unit are provided below.
I. Standalone GPS receiver
II. Anti jamming technology
III. UART Interface at the output pins (Can use SPI, I2C and USB by soldering pins to the chip core)
IV. Under 1 second time-to-first-fix for hot and aided starts
V. Receiver type: 50 Channels—GPS L1 frequency—SBAS (WAAS, EGNOS, MSAS, GAGAN)
VI. Time-To-First-fix: For Cold Start 32 s, For Warm Start 23 s, For Hot Start<1 s
VII. Maximum navigation update rate: 5 Hz
VIII. Default baud rate: 9600 bps
IX. EEPROM with battery backup
X. Sensitivity: −160 dBm
XI. Supply voltage: 3.6V
XII. Maximum DC current at any output: 10 mA
XIII. Operation limits: Gravity-4 g, Altitude-50000m, Velocity-500 m/s
XIV. Operating temperature range: −40° C. TO 85° C.

In an example, the patch antenna 406 is a 25×25×4 mm ceramic antenna, which provides a strong satellite search capability. Further, the GPS unit 402 includes power and signal indicators, thereby enabling monitoring of the status of the GPS unit 402 with ease. In an example, the GPS unit 402 includes a data backup battery, such that the GPS unit 402 can save the data when the power of the rechargeable battery is not available.

Figure 4B:
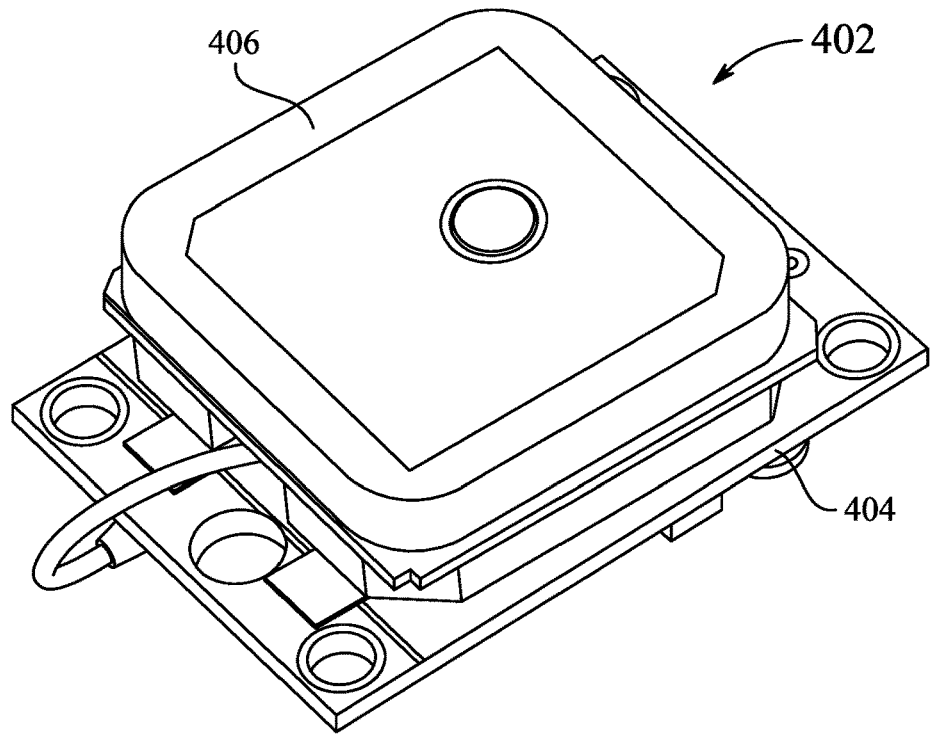
FIG. 4B illustrates a bottom view of the GPS unit, according to aspects of the present disclosure.

FIG. 4B illustrates a bottom view of the GPS unit 402, according to aspects of the present disclosure. As shown in FIG. 4B, the patch antenna 406 is stacked over the global positioning receiver 404. The position of the patch antenna 406 mounting is important to achieve a desired optimal performance of the GPS unit 402. The patch antenna 406 is located in the smart collar 210 such that the patch antenna 406 is mounted and oriented parallel to the geographic horizon. In some examples, the patch antenna 406 is positioned to provide maximum exposure to support a direct line of sight with as many satellites on the horizon as possible.

Figure 4C:
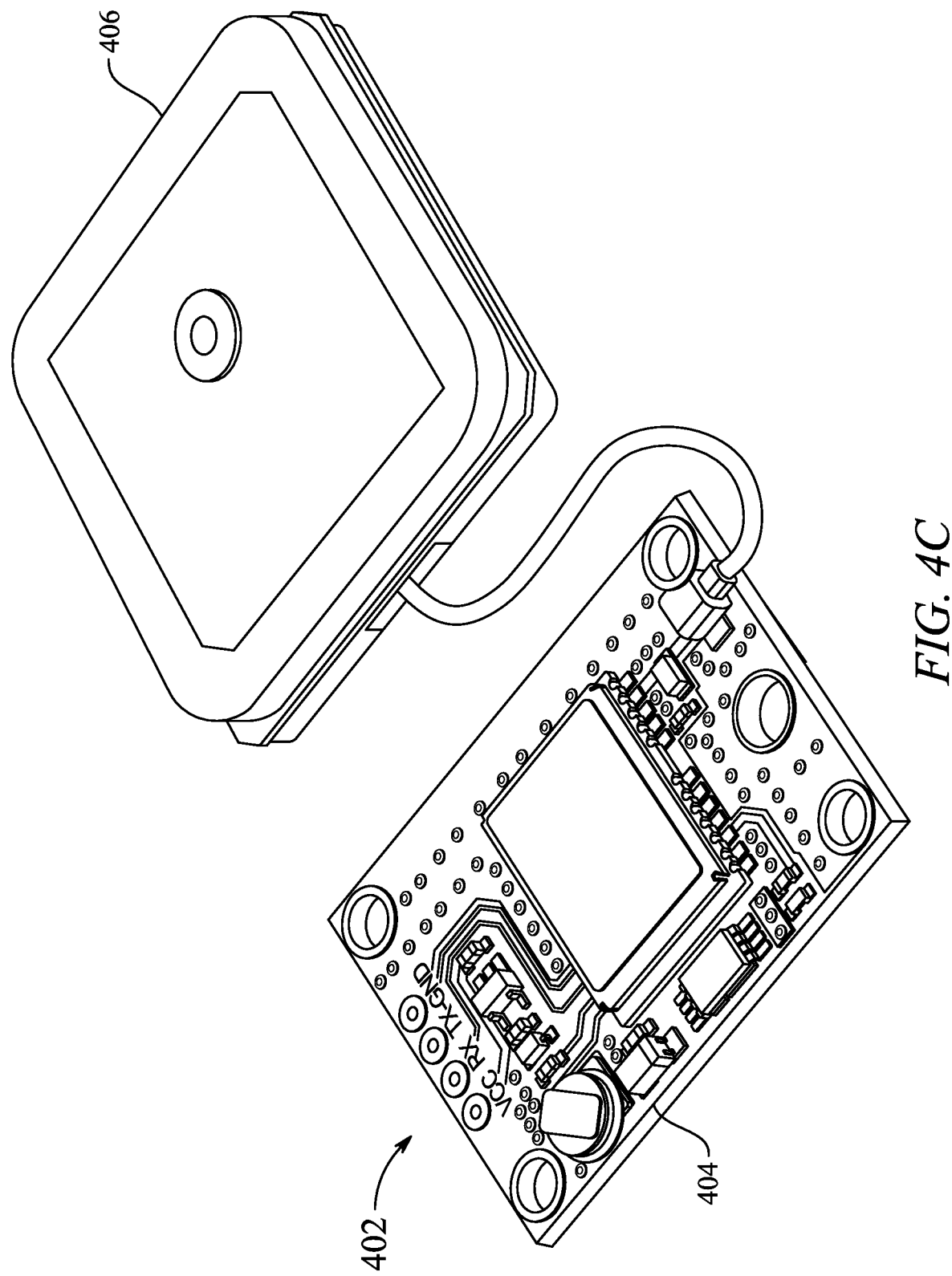
FIG. 4C illustrates a connection interface of a global positioning receiver with a patch antenna, according to aspects of the present disclosure.

FIG. 4C illustrates a connection interface of the global positioning receiver 404 with the patch antenna 406. The patch antenna 406 is connected to the global positioning receiver 404 through a U.FL cable, which allows for flexibility in mounting the GPS unit 402 such that the patch antenna 406 is positioned towards the sky for best performance.

Referring to FIGS. 4A-4C, the patch antenna 406 may have a flat surface, and has a ceramic and metal body, and is mounted on a metal base plate. The patch antenna 406 is configured to be cast in a housing of the smart collar 110. In an example, the patch antenna 406 is a 25×25 mm active GPS antenna with the UART TTL socket.

Figure 5A:
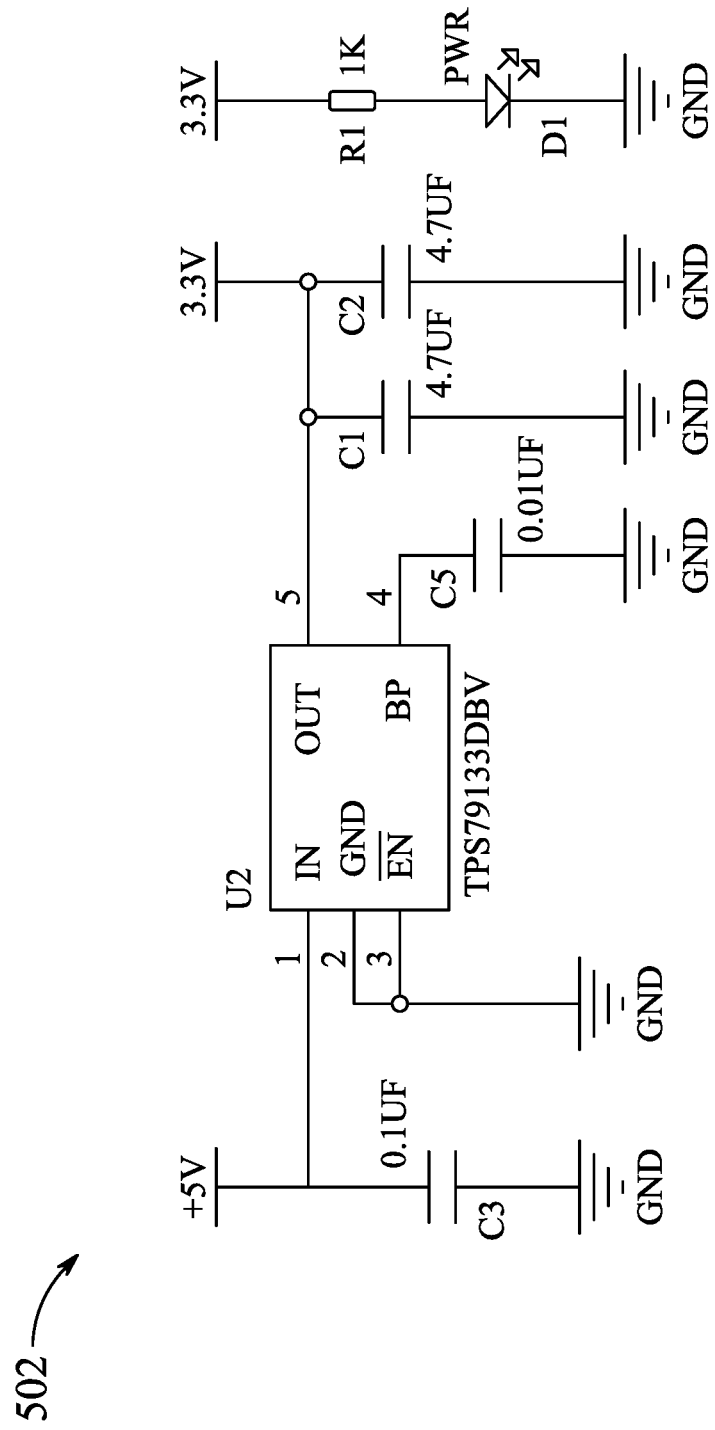
FIG. 5A illustrates a circuit diagram of the GPS unit, according to aspects of the present disclosure.

FIG. 5A illustrates a circuit diagram 502 of the GPS unit, according to aspects of the present disclosure. The circuit diagram may refer to circuit of the GPS unit 402. As shown in FIG. 5A, the GPS unit has serial TTL output. The GPS unit has four pins: TX, RX, VCC, and GND. The GND pin is the ground pin that is connected with the ground of the microcontroller. The TX pin is a transmission pin used for serial communication. The RX pin is a receiver pin used for serial communication. The VCC pin is the VCC pin used to power up the GPS unit. Connect it with the 5V of the Arduino UNO board. In an example, the GPS unit has supply voltage of 3.3 V.

Figure 5B:
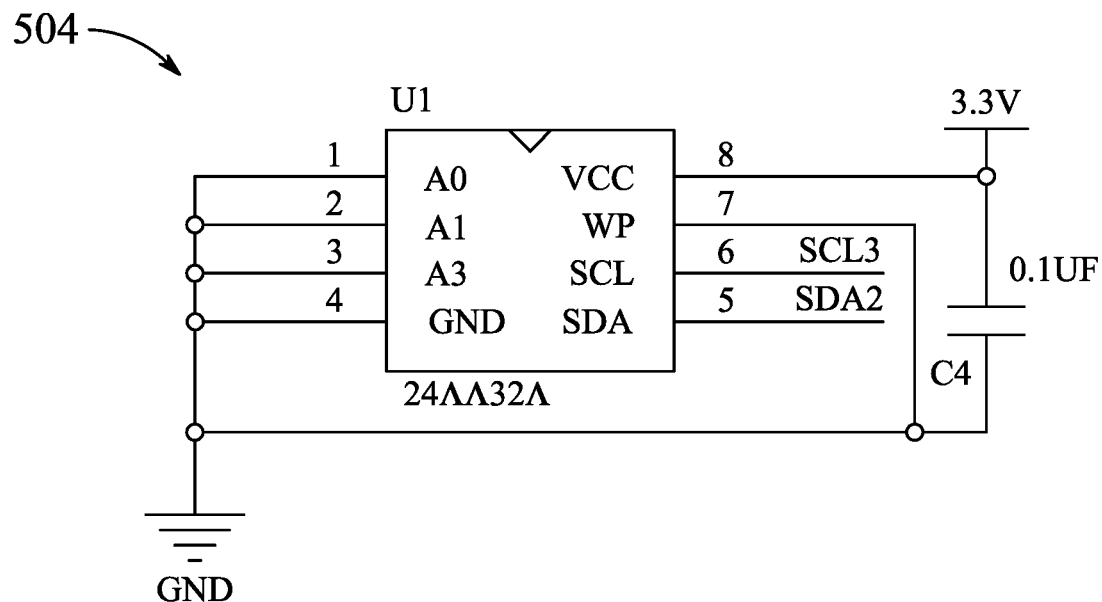
FIG. 5B illustrates a schematic diagram of the GPS unit, according to aspects of the present disclosure.

FIG. 5B illustrates a schematic diagram 504 of the GPS unit, according to aspects of the present disclosure.

Figure 5C:
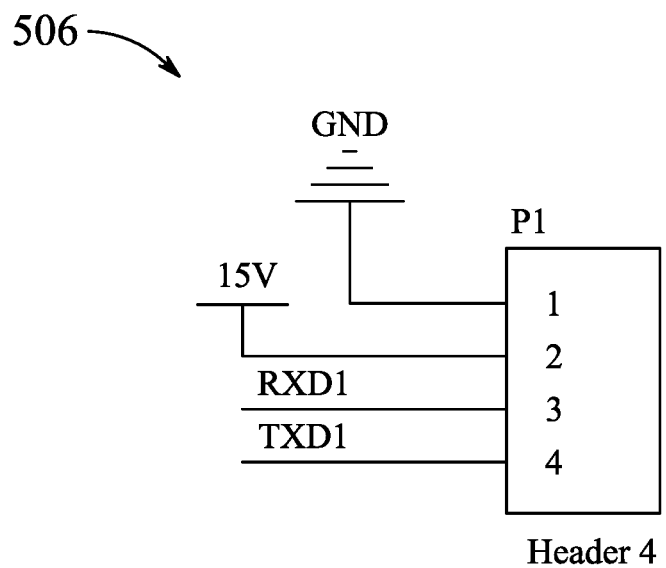
FIG. 5C illustrates another circuit diagram of the GPS unit, according to aspects of the present disclosure.

FIG. 5C illustrates another circuit diagram 506 of the GPS unit, according to aspects of the present disclosure.

Figure 5D:
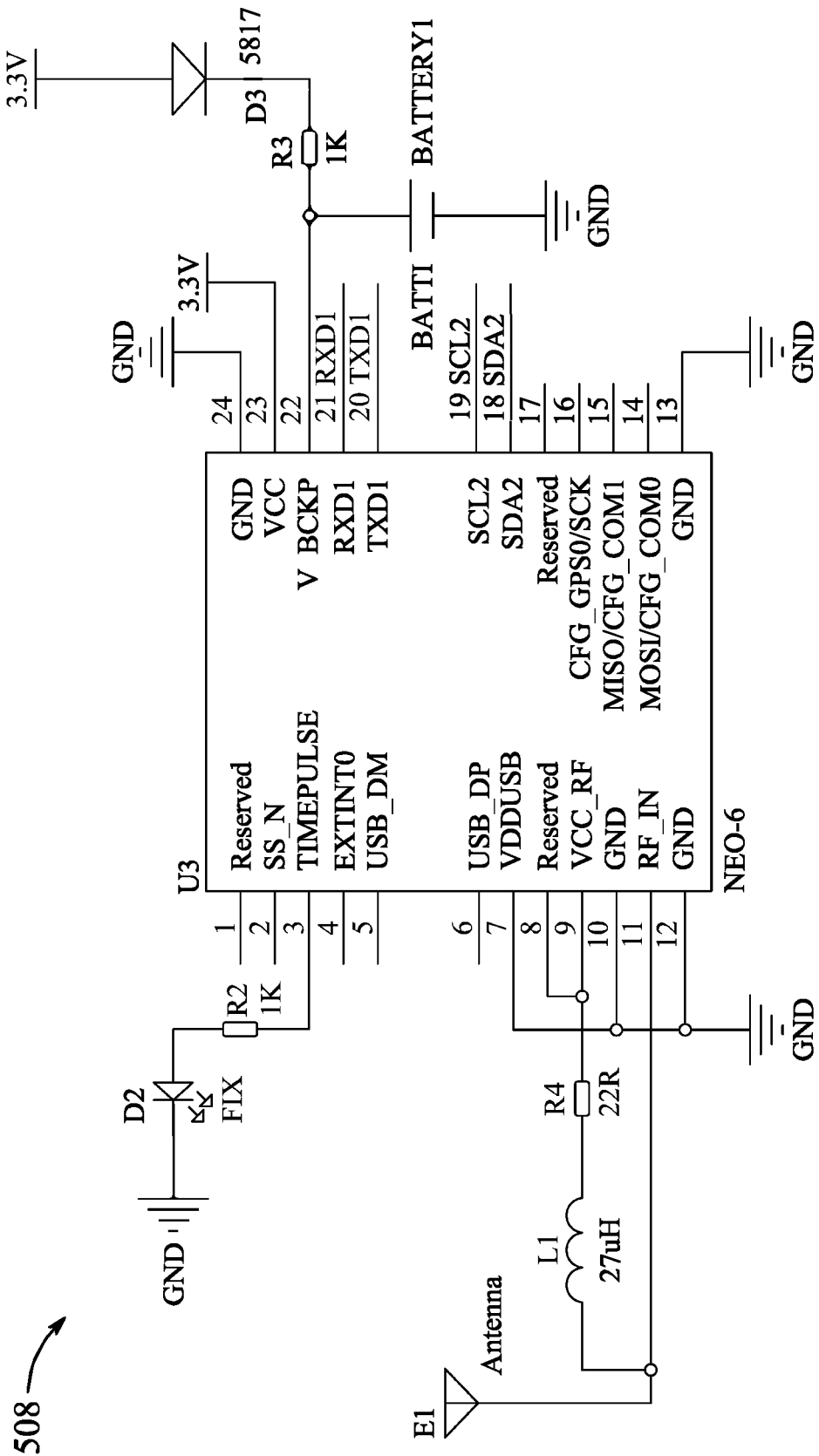
FIG. 5D illustrates a pin configuration of the GPS unit, according to aspects of the present disclosure.

FIG. 5D illustrates a pin configuration 508 of the GPS unit, according to aspects of the present disclosure. [Note to Inventor: Please provide some information of]

Referring to FIGS. 5A-5D, the NEO-6M GPS unit has 4 terminals which is used to connect the with the GPS unit with the microcontroller. As the GPS unit is 5V tolerant, hence the GPS unit can connect the VCC terminal with 5V of the microcontroller. The TX (transmitter) terminal and the RX (receiver) terminal of the GPS unit is connected with the digital pins of the microcontroller.

Figure 6A:
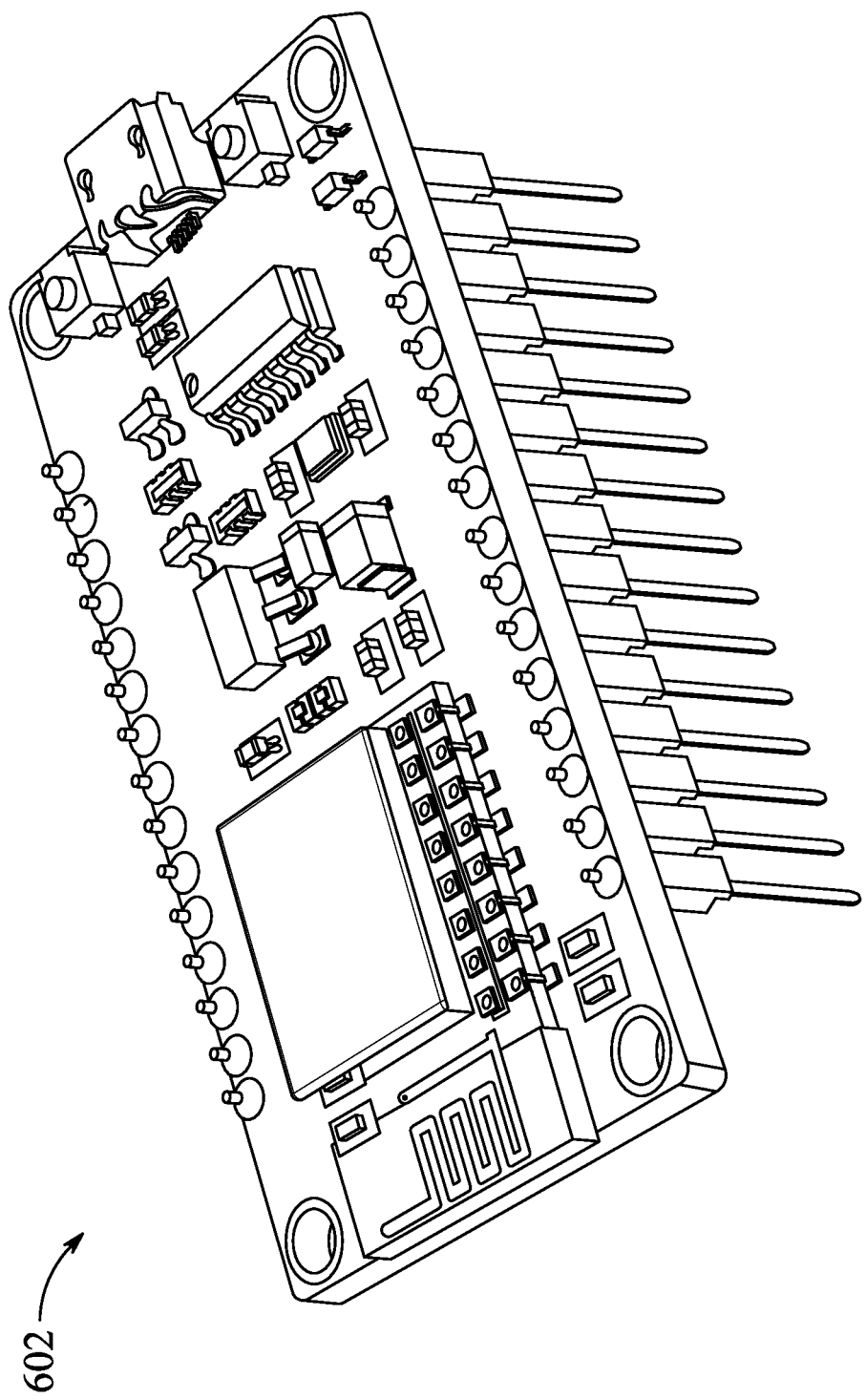
FIG. 6A illustrates a top view of a microcontroller unit, according to aspects of the present disclosure.

FIG. 6A illustrates a top view 602 of a microcontroller unit 618, according to aspects of the present disclosure. The microcontroller unit 618 may be used for implementing the microcontroller 118. In an aspect, the microcontroller unit 618 is an NodeMCU (Node MicroController Unit) ESP8266 (designed and manufactured by Espressif Systems, located at #204, Block 2, 690 Bibo Road, Shanghai). The NodeMCU has Analog (i.e. AO) and Digital (DO-D8) pins. For example, the NodeMCU supports serial communication protocols i.e. UART, SPI, I2C, etc.

Figure 6B:
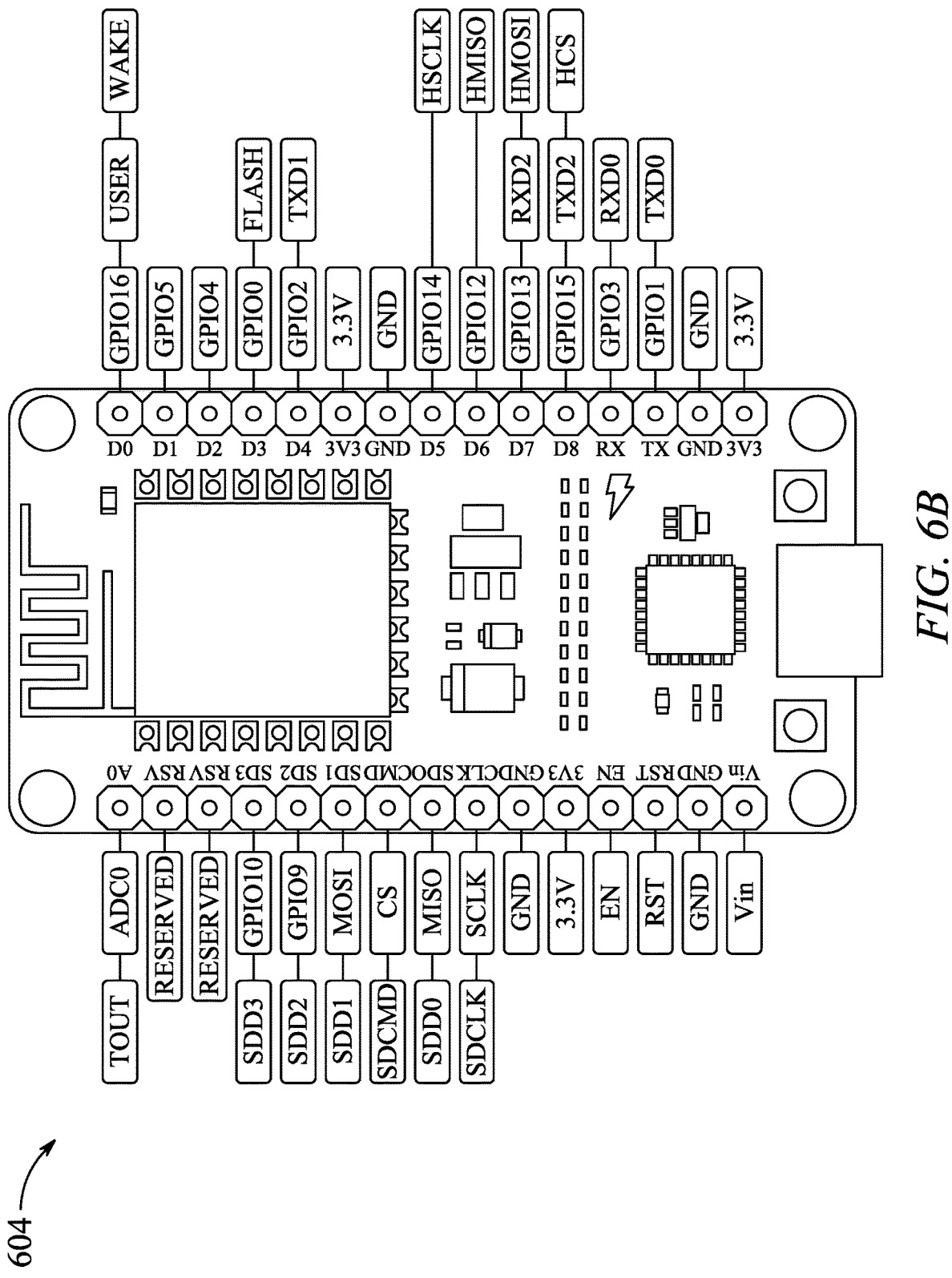
FIG. 6B illustrates a pin configuration of the microcontroller unit, according to aspects of the present disclosure.

FIG. 6B illustrates a pin configuration 604 of the microcontroller unit 618, according to aspects of the present disclosure. The NodeMCU ESP8266 includes various elements such as: CPU, memory (RAM), networking (WiFi), and a modern operating system and Software Development Kit (SDK). In an example, the ESP8266 is a development board that incorporates both Wi-Fi and Bluetooth. In some examples, the ESP8266 is programmed using an Arduino IDE with ESP8266 libraries installed. For example, the NodeMCU acts as a base for the collar hardware, which is interconnected to the other components of the smart collar 210. Table 2 represents the pinout configuration of the NodeMCU ESP8266.

TABLE 2

NodeMCU development board pinout configuration

| Pin Category | Name | Description |
| --- | --- | --- |
| Power | Micro-USB | Micro-USB: NodeMCU can be powered through the USB port |
|  | 3.3 V | 3.3 V: Regulated 3.3 V can be supplied to this pin to power the board |
|  | GND |  |

TABLE 2-continued

NodeMCU development board pinout configuration

| Pin Category | Name | Description |
|---|---|---|
| | Vin | GND: Ground pins<br>Vin: External Power Supply |
| Control Pins | EN, RST | The pin and the button resets the microcontroller |
| Analog Pin | A0 | Used to measure analog voltage in the range of 0-3.3 V |
| GPIO Pins | GPIO1 to GPIO16 | NodeMCU has 16 general purpose input-output pins on its board |
| SPI Pins | SD1, CMD, SD0, CLK | NodeMCU has four pins available for SPI communication. |
| UART Pins | TXD0, RXD0, TXD2, RXD2 | NodeMCU has two UART interfaces, UART0 (RXD0 & TXD0) and UART1 (RXD1 & TXD1). UART1 is used to upload the firmware/program. |
| I2C Pins | | NodeMCU has I2C functionality support but due to the internal functionality of these pins, you have to find which pin is I2C. |

Figure 7:
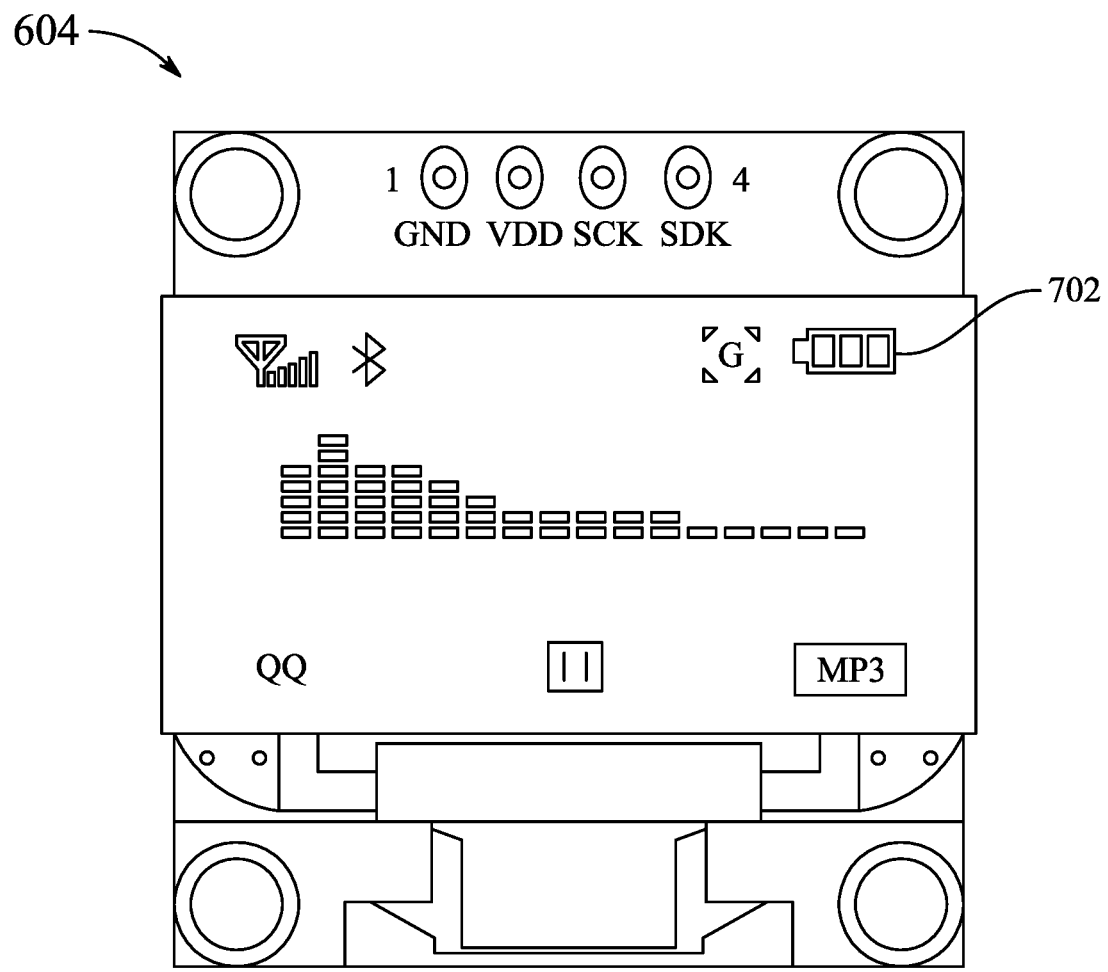
FIG. 7 is a plan view of an exemplary OLED display, according to aspects of the present disclosure.

FIG. 7 is a plan view of an exemplary OLED display 700, according to aspects of the present disclosure. The OLED display 700 is configured to display the message. In an example, the message may be a "lost pet" message or the contact information of the pet owner. For example, the OLED display 700 is a 0.96 inch I2C 4-Pin OLED display unit. The 0.96 inch I2C OLED display is an OLED monochrome 128×64 dot matrix display unit with I2C Interface. The OLED display 700 has a number of advantages such as high brightness, self-emission, high contrast ratio, slim outline, wide viewing angle, wide temperature range, and low power consumption. The OLED display 700 is compatible with any known 3.3V-5V microcontrollers, such as, for example, the Arduino In an example, the OLED display 700 includes a battery status 702 that is configured to display the SoC of the battery and indicate when the battery is in a charging mode. In an example, the battery status 702 may be shown as a bar graph or may be shown in a text readout on the battery status page 702.

In an example, various electrical components of the smart collar 110 can also be housed within a pet's clothes, such as a pet sweater, pet leggings, or even implanted in the pet.

In an aspect, the smart collar 110 may be configured for different pets including a dog, a cat, a parakeet (miniaturized bib with reduced features), and reptiles (smart collar implemented as a bib with reduced features). The smart collar 110 can also be used on farm animals (for example, cows, buffaloes, horses) that tend to stray away or lose their way frequently.

In an aspect, the smart collar 110 may also include various health monitoring sensors (not shown) such as temperature sensor, pulse sensors, to determines a state of health of the pet and communicates through microcontroller 118 the state of health when the pet is lost.

The first embodiment is illustrated with respect to FIGS. 1-3. The first embodiment describes a system 100 for monitoring a pet. The system includes a smart collar 110 configured to surround a neck of the pet, a mobile computing device 150 including a display screen 152, and a pet monitoring mobile application 154 stored on the mobile computing device 150. The smart collar 110 includes a global positioning receiver configured to receive a current location of the smart collar 110, a communications device, an organic light-emitting diode (OLED) display, a rechargeable battery, a microcontroller 118 connected to the global positioning receiver, the OLED display 116 and the communications device. The microcontroller 118 is configured to: calculate a distance of a current location of the smart collar 110 from a desired location, determine when the distance is greater than a first distance threshold, generate a communications packet including the current location, the perimeter, and the distance of the smart collar 110 from the desired location, and transmit the communications packet. The mobile computing device 150 is configured to receive the communications packet. The pet monitoring mobile application 154 is configured to display the current location on the display screen 152 of the mobile computing device 150.

Further, the system 100 includes a buzzer 124 located on an outer surface of the smart collar 110, a buzzer switch 126 connected to the buzzer 124, and wherein the microcontroller 118 is further configured to connect the buzzer switch 126 to the rechargeable battery 122 to actuate the buzzer 124 when the distance is greater than a first distance threshold.

In an aspect, the microcontroller 118 is further configured to: receive location coordinates of the mobile computing device, detect a proximity distance of the smart collar 110 from the mobile computing device, and actuate the buzzer switch 126 to connect the rechargeable battery 122 to the buzzer 124 when the proximity distance is less than a second distance threshold.

Further, the system 100 includes a light emitting diode (LED) 128 located on an outer surface of the smart collar 110, wherein the microcontroller 118 is connected to the LED 228 and is further configured to generate drive signals which actuate the LED 228 to flash when the distance is greater than the first distance threshold.

In an aspect, the microcontroller 118 is further configured to: determine when the distance is greater than a first distance threshold and show a lost pet message on the OLED display 116.

Further, the system 100 includes a memory located in the microcontroller 118, wherein the memory is configured to store a contact information of an owner of the pet, the microcontroller 118 is further configured to retrieve the contact information of the owner of the pet from the memory, and show the contact information on the OLED display 116.

Further, the system 100 includes the LED 128 located on an outer surface of the smart collar 110, wherein the battery is connected to the LED 128 by a lighting switch, an optional light monitor 132 connected to the smart collar 110, wherein the light monitor 132 is configured to detect an intensity of ambient light at the smart collar 110, and generate a lighting signal when the intensity of the ambient light falls below a light threshold, and the microcontroller 118 is connected to the LED 128, the lighting switch 130 and the light monitor 132, and is further configured to receive the lighting signal and actuate the lighting switch 130 to connect the battery to the LED 128 when the intensity of the ambient light falls below the light threshold and the distance is greater than a first distance threshold.

Further, the system 100 includes a solar array 138 located on an outer surface of the smart collar 110, wherein the solar array 138 is configured to generate an electric current when the smart collar 110 is exposed to sunlight, and a rectifier circuit 136 located within the smart collar 110, wherein the rectifier circuit 136 is connected to the solar array 138 and is configured to convert the electric current to a direct current, wherein the rechargeable battery 122 is connected to the rectifier circuit 136 and is configured to be recharged by the direct current.

Further, the system 100 includes a battery monitor 140 connected in parallel with the rechargeable battery 122 and connected in series with the microcontroller 118, wherein the battery monitor 140 is configured to transmit a battery SoC to the microcontroller 118, wherein the microcontroller 118 is configured to include the battery SoC in the communications packet, and wherein the pet monitoring mobile application 154 is configured to display the SoC on the display screen 152 of the mobile computing device 150.

The system 100 further includes a universal serial bus (USB) charging port located on the smart collar 110, wherein the USB charging port 134 is configured to connect to a power supply cable, and the microcontroller 118 is further configured to determine when the SoC is below a threshold SoC, and show a low battery indication on the OLED display 116.

The system 100 further includes an antenna 142 located within the smart collar 110, wherein the global positioning receiver and the communications device 114 are connected to the antenna 142.

The system 100 further includes a mapping application 156 stored on the mobile computing device, wherein the mapping application 156 is configured to generate a map and render the map on the display screen 152 of the mobile computing device 150 with the current location.

In an aspect, the pet monitoring mobile application 154 is configured to generate a plurality of pages on the display screen 152 of mobile computing device, wherein the plurality of pages include a home page, a registration page configured to receive a name and an address of the owner of the pet, the contact information of the owner of the pet, the desired location of the pet, the perimeter enclosing the desired location of the pet, and a feeding schedule of the pet, a login page, a pet tracking page including the map, a set button configured for updating the current position of the pet on the map, a lost and found page configured to display lost and found pets within a set distance from the desired location, a feeding page configured to display a feeding schedule and generate a notification when it is time to feed the pet, and a battery status page.

The second embodiment is illustrated with respect to FIGS. 1-3. The second embodiment describes a method for monitoring a pet wearing a smart collar 110. The method includes storing a contact information of an owner of the pet in a memory of a microcontroller 118 located in the smart collar 110, setting a perimeter enclosing a desired location of the pet by the microcontroller 118 located in the smart collar 110, determining a current location of the smart collar 110 by a global positioning receiver, calculating a distance of a current location of the smart collar 110 from the desired location by the microcontroller 118, comparing the distance to a first distance threshold by the microcontroller 118, when the distance is greater than the first distance threshold, generating a communications packet including the contact information, the perimeter, the current location and the distance of the smart collar 110 from the desired location, transmitting the communications packet to a pet monitoring mobile application 154 stored on a mobile computing device, and displaying the current location on a display screen 152 of the mobile computing device 150.

When the distance is greater than the first distance threshold, the method further includes actuating a buzzer 124 by the microcontroller 118, generating, by the microcontroller 118, drive signals to flash a LED 228 located on an outer surface of the smart collar 110, retrieving, by the microcontroller 118, the contact information from the memory, and displaying, by the microcontroller 118, a lost pet message and the contact information on an OLED display 116 connected to the smart collar 110.

The method further includes receiving location coordinates of the mobile computing device 150 by the microcontroller 118, calculating a proximity distance of the smart collar 110 from the mobile computing device 150 by the microcontroller 118, and actuating a buzzer switch 126 to connect the rechargeable battery 122 to the buzzer 124 when the proximity distance is less than a second distance threshold by the microcontroller 118.

The method further includes determining, by a battery monitor 140 connected in parallel with the rechargeable battery 122 and in series with the microcontroller 118, a SoC of the rechargeable battery, comparing the SoC to a charge threshold; determining, by the microcontroller 118, whether the SoC is less than the charge threshold; when the SoC is less than the charge threshold, displaying, by the microcontroller 118, a low battery indicator on the OLED display 116; transmitting, by a communications device 114 connected to the microcontroller 118, the state of charge in the communications packet to the pet monitoring mobile application 154; and displaying the state of charge and the charge threshold on the display screen 152 of the mobile computing device 150.

The method further includes recharging the rechargeable battery 122 by solar cells located on an outer surface of the smart collar 110, monitoring the state of charge by the battery monitor 140, and when the state of charge is less than the charge threshold, connecting a universal serial bus (USB) charging port located on the smart collar 110 to a power source to recharge the rechargeable battery.

The method further includes displaying, by the pet monitoring mobile application 154, a plurality of pages on the display screen 152 of mobile computing device 150. The plurality of pages include a home page, a registration page configured to receive a name and an address of the owner of the pet, the contact information of the owner of the pet, the desired location of the pet, the perimeter enclosing the desired location of the pet, and a feeding schedule of the pet, a login page, a pet tracking page including a map, a set button configured for updating the current position of the pet on the map, a lost and found page configured to display lost and found pets within a set distance from the desired location, a feeding page configured to display a feeding schedule and generate a notification when it is time to feed the pet, and a battery status page.

The third embodiment is illustrated with respect to FIGS. 1-3. The third embodiment describes a non-transitory computer readable medium having instructions stored therein that, when executed by one or more processors, cause the one or more processors to perform a method for monitoring a pet wearing a smart collar 110. The method includes storing, in a memory of a microcontroller 118 located in the smart collar 110, a contact information of an owner of the pet; setting, by the microcontroller 118 located in the smart collar 110, a perimeter enclosing a desired location of the pet; determining, by a global positioning receiver, a current location of the smart collar 110; calculating, by the microcontroller 118, a distance of a current location of the smart collar 110 from the desired location; comparing, by the microcontroller 118, the distance to a first distance threshold; when the distance is greater than the first distance threshold, generating a communications packet including the contact information, the perimeter, the current location and the distance of the smart collar 110 from the desired location; transmitting the communications packet to a pet monitoring mobile application 154 stored on a mobile computing device; and displaying the current location on a display screen 152 of the mobile computing device 150.

Figure 8:
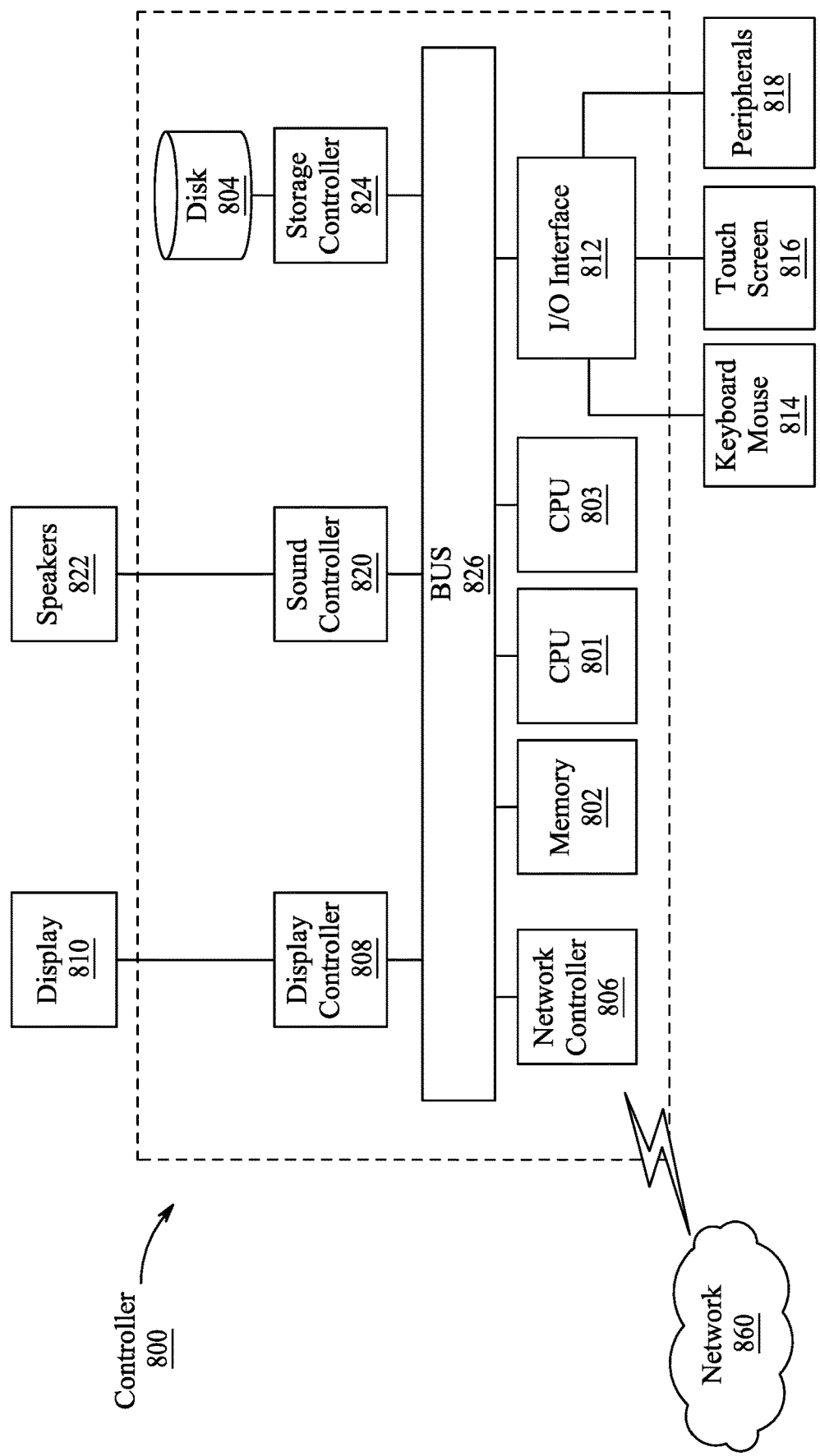
FIG. 8 is an illustration of a non-limiting example of details of computing hardware used in the computing system, according to aspects of the present disclosure.

Next, further details of the hardware description of the computing environment of FIG. 1 according to exemplary embodiments is described with reference to FIG. 8. In FIG. 8, a controller 800 is described as representative of the smart collar 110, and of the mobile computing device 150 of FIG. 1 in which the controller is a microcontroller 118 which includes a CPU 801 which performs the processes described above/below. The process data and instructions may be stored in memory 802. These processes and instructions may also be stored on a storage medium disk 804 such as a hard drive (HDD) or portable storage medium or may be stored remotely. Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 9, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skilled in the art. Alternatively, the CPU 801, 803 may be implemented on an FPGA, ASIC, PLD or using discrete logic circuits, as one of ordinary skilled in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN subnetworks. The network 860 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
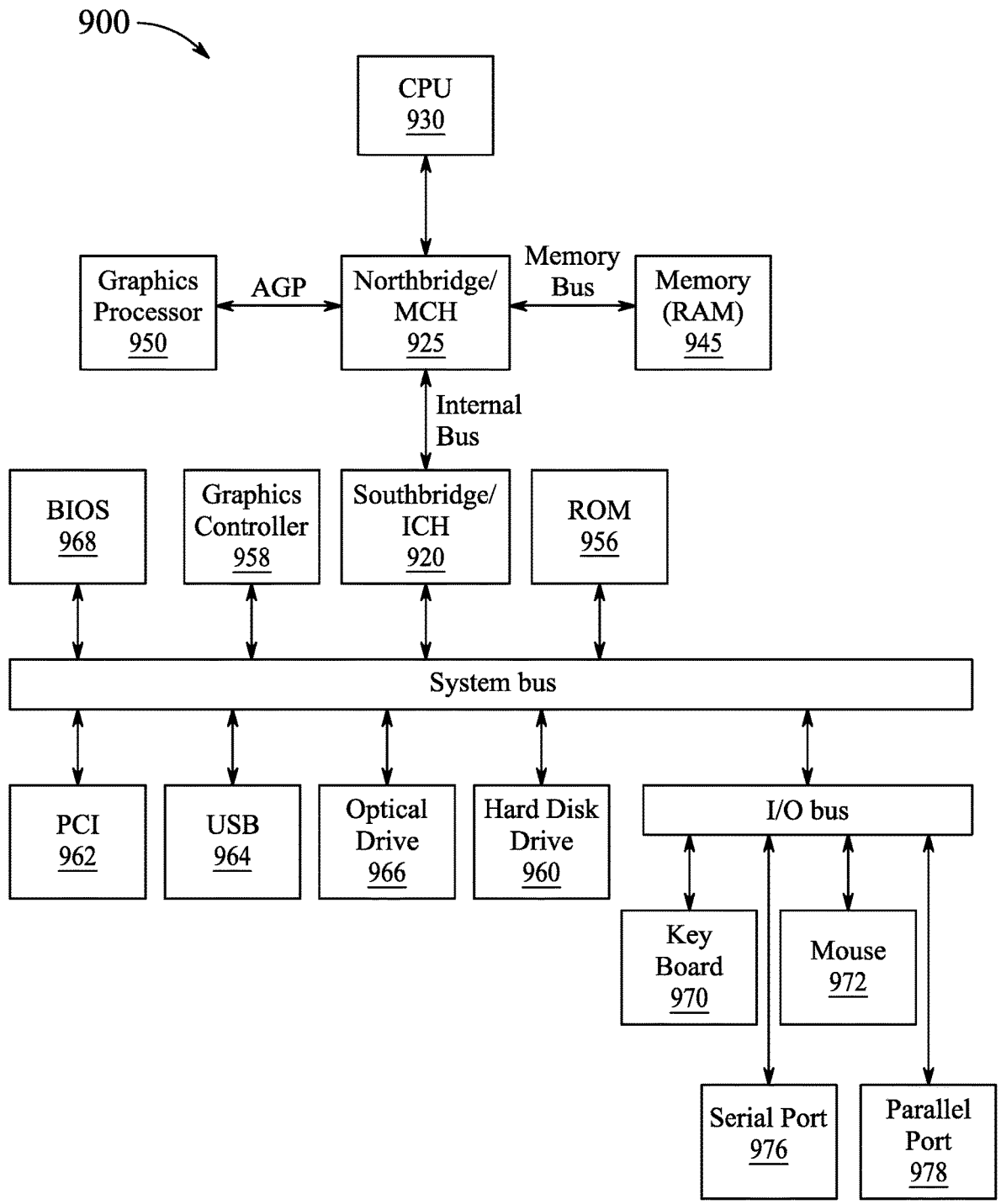
FIG. 9 is an exemplary schematic diagram of a data processing system used within the computing system, according to aspects of the present disclosure.

FIG. 9 shows a schematic diagram of a data processing system 900 used within the computing system, according to exemplary aspects of the present disclosure. The data processing system 900 is an example of a computer in which code or instructions implementing the processes of the illustrative aspects of the present disclosure may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
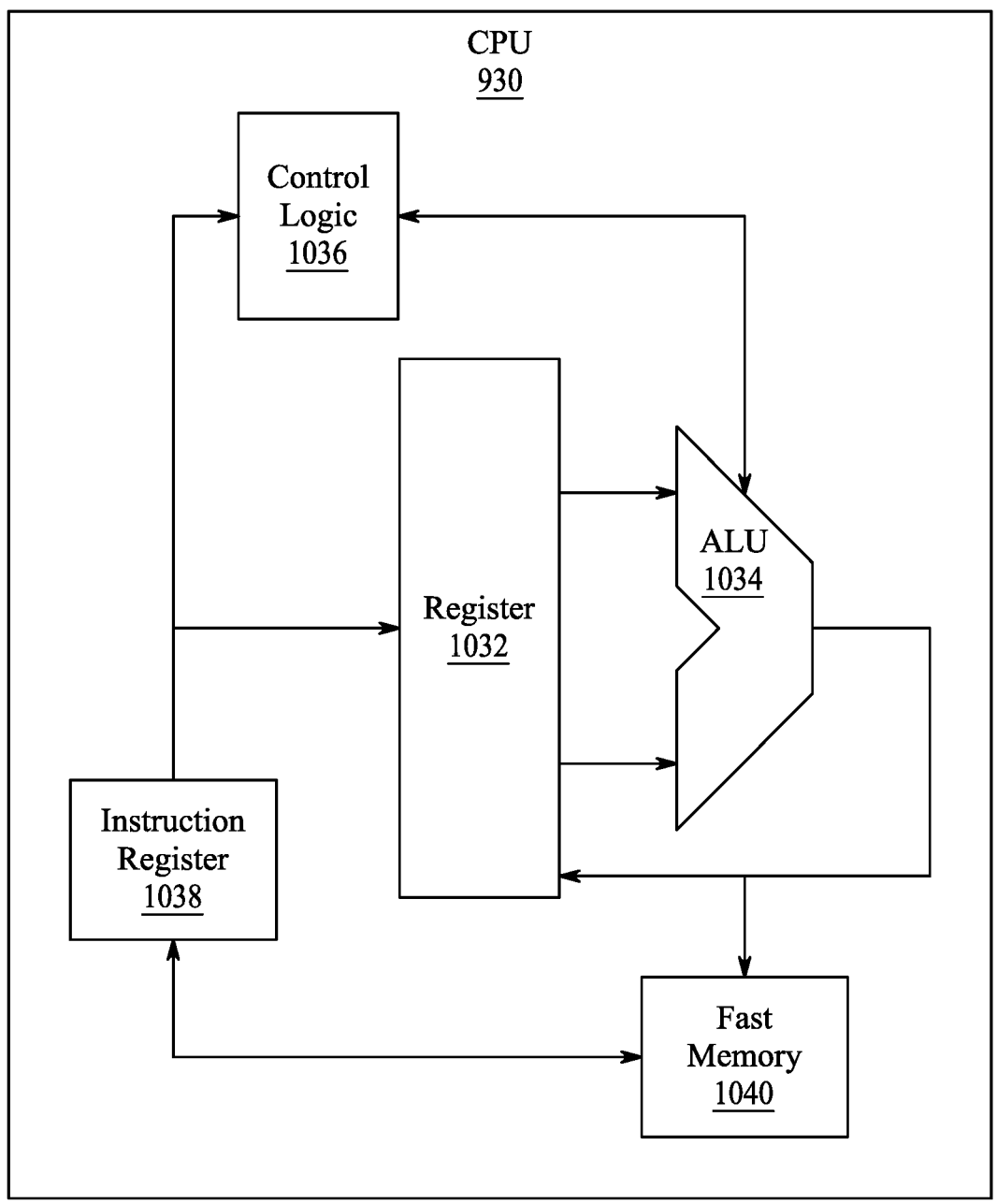
FIG. 10 is an exemplary schematic diagram of a processor used with the computing system, according to aspects of the present disclosure.

For example, FIG. 10 shows one aspects of the present disclosure of CPU 930. In one aspects of the present disclosure, the instruction register 1038 retrieves instructions from the fast memory 1040. At least part of these instructions is fetched from the instruction register 1038 by the control logic 1036 and interpreted according to the instruction set architecture of the CPU 930. Part of the instructions can also be directed to the register 1032. In one aspects of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain aspects of the present disclosures, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD.

Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 920 through a PCI bus 962.

The PCI devices may include, for example, Ethernet adapters, add-in cards, and PC cards for notebook computers. The Hard disk drive 960 and CD-ROM 956 can use, for example, an integrated drive electronics (IDE) or serial advanced technology attachment (SATA) interface. In one aspects of the present disclosure the I/O bus can include a super I/O (SIO) device. Further, the hard disk drive (HDD) 960 and optical drive 966 can also be coupled to the SB/ICH 920 through a system bus. In one aspects of the present disclosure, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
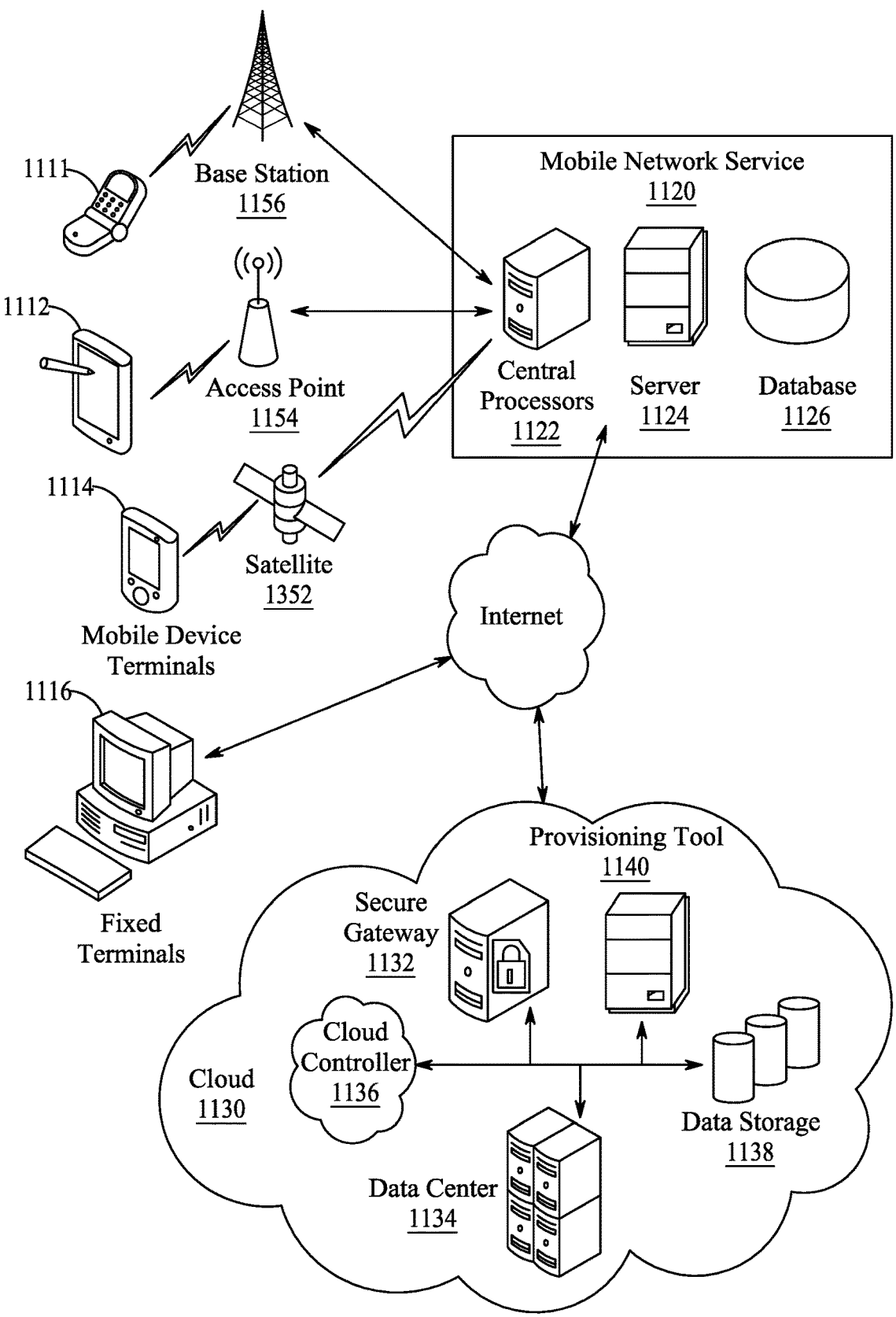
FIG. 11 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). More specifically, FIG. 11 illustrates client devices including a smart phone 1111, a tablet 1112, a mobile device terminal 1114 and fixed terminals 1116. These client devices may be commutatively coupled with a mobile network service 1120 via base station 1156, access point 1154, satellite 1152 or via an internet connection. Mobile network service 1120 may comprise central processors 1122, a server 1124 and a database 1126. Fixed terminals 1116 and mobile network service 1120 may be commutatively coupled via an internet connection to functions in cloud 1130 that may comprise security gateway 1132, data center 1134, cloud controller 1136, data storage 1138 and provisioning tool 1140. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A system for monitoring a pet, comprising:
a smart collar configured to surround a neck of the pet, the smart collar including:
 a global positioning receiver configured to receive a current location of the smart collar;
 a communications device;
 an organic light-emitting diode (OLED) display;
 a rechargeable battery;
 a microcontroller connected to the global positioning receiver, the OLED display and the communications device, wherein the microcontroller is configured to:
  calculate a distance of a current location of the smart collar from a desired location,
  determine when the distance is greater than a first distance threshold, and
  generate a communications packet including the current location, the perimeter, and the distance of the smart collar from the desired location, and transmit the communications packet;
a mobile computing device including a display screen, wherein the mobile computing device is configured to receive the communications packet;
a buzzer located on an outer surface of the smart collar;
a buzzer switch connected to the buzzer; and
 wherein the microcontroller is further configured to connect the buzzer switch to the rechargeable battery to actuate the buzzer when the distance is greater than the first distance threshold; and
a pet monitoring mobile application stored on the mobile computing device, wherein the pet monitoring mobile application is configured to display the current location on the display screen of the mobile computing device.

2. The system of claim 1, wherein the microcontroller is further configured to:
receive location coordinates of the mobile computing device;
calculate a proximity distance of the smart collar from the mobile computing device; and
actuate the buzzer switch to connect the rechargeable battery to the buzzer when the proximity distance is less than a second distance threshold.

3. The system of claim 1, further comprising:
a light emitting diode (LED) located on an outer surface of the smart collar, wherein the microcontroller is connected to the LED and is further configured to generate drive signals which actuate the LED to flash when the distance is greater than the first distance threshold.

4. The system of claim 1, wherein the microcontroller is further configured to:
determine when the distance is greater than the first distance threshold; and
show a lost pet message on the OLED display.

5. The system of claim 4, further comprising:
a memory located in the microcontroller, wherein the memory is configured to store a contact information of an owner of the pet;
the microcontroller is further configured to retrieve the contact information of the owner of the pet from the memory; and
show the contact information on the OLED display.

6. The system of claim 1, further comprising:
a light emitting diode (LED) located on an outer surface of the smart collar;
wherein the battery is connected to the LED by a lighting switch;
the microcontroller is connected to the LED and the lighting switch, and is further configured to actuate the lighting switch to connect the battery to the LED when one of the distance is greater than the first distance threshold.

7. The system of claim 1, further comprising;
a solar array located on an outer surface of the smart collar, wherein the solar array is configured to generate an electric current when the smart collar is exposed to sunlight; and
a rectifier circuit located within the smart collar, wherein the rectifier circuit is connected to the solar array and is configured to convert the electric current to a direct current, wherein the rechargeable battery is connected to the rectifier circuit and is configured to be recharged by the direct current.

8. The system of claim 1, further comprising;
a battery monitor connected in parallel with the rechargeable battery and connected in series with the microcontroller, wherein the battery monitor is configured to transmit a battery state of charge to the microcontroller;
wherein the microcontroller is configured to include the battery state of charge in the communications packet; and
wherein the pet monitoring mobile application is configured to display the state of charge on the display screen of the mobile computing device.

9. The system of claim 8, further comprising:
a universal serial bus (USB) charging port located on the smart collar, wherein the USB charging port is configured to connect to a power supply cable; and
the microcontroller is further configured to determine when the state of charge is below a threshold state of charge, and show a low battery indication on the OLEO display.

10. The system of claim 1, further comprising:
an antenna located within the smart collar, wherein the global positioning receiver and the communications device are connected to the antenna.

11. The system of claim 1, further comprising;
a mapping application stored on the mobile computing device, wherein the mapping application is configured to generate a map and render the map on the display screen of the mobile computing device with the current location.

12. The system of claim 1, further comprising:
wherein the pet monitoring mobile application is configured to generate a plurality of pages on the display screen of mobile computing device, wherein the plurality of pages include:
a home page:
a registration page configured to receive a name and an address of the owner of the pet, the contact information of the owner of the pet, the desired location of the pet the perimeter enclosing the desired location of the pet, and a feeding schedule of the pet;
a login page;
a pet tracking page including the map;
a set button configured for updating the current position of the pet on the map;
a lost and found page configured to display lost and found pets within a set distance from the desired location;
a feeding page configured to display a feeding schedule and generate a notification when it is time to feed the pet; and
a battery status page.

* * * * *